(12) United States Patent
Ono et al.

(10) Patent No.: US 7,362,894 B2
(45) Date of Patent: Apr. 22, 2008

(54) IMAGE PROCESSING APPARATUS AND METHOD, RECORDING MEDIUM, AND PROGRAM

(75) Inventors: Hiroaki Ono, Saitama (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 10/731,237

(22) Filed: Dec. 10, 2003

(65) Prior Publication Data

US 2004/0169747 A1 Sep. 2, 2004

(30) Foreign Application Priority Data

Jan. 14, 2003 (JP) .............................. 2003-005587

(51) Int. Cl.
*G06K 9/00* (2006.01)
*G03F 3/08* (2006.01)
(52) U.S. Cl. ..................... 382/167; 358/518; 358/519
(58) Field of Classification Search ................ 382/167; 348/222.1; 358/518, 519
See application file for complete search history.

(56) References Cited

U.S. PATENT DOCUMENTS

| | | | | |
|---|---|---|---|---|
| 6,069,973 | A * | 5/2000 | Lin et al. ..................... | 382/167 |
| 6,144,412 | A * | 11/2000 | Hirano et al. ................. | 348/441 |
| 6,721,003 | B1 * | 4/2004 | Tsuruoka et al. ......... | 348/240.2 |
| 7,088,392 | B2 * | 8/2006 | Kakarala et al. ............. | 348/272 |
| 7,102,669 | B2 * | 9/2006 | Skow ....................... | 348/222.1 |
| 7,133,073 | B1 * | 11/2006 | Neter .......................... | 348/272 |
| 2003/0197793 | A1 | 10/2003 | Mitsunaga et al. | |
| 2004/0109068 | A1 | 6/2004 | Mitsunaga et al. | |

FOREIGN PATENT DOCUMENTS

| | | |
|---|---|---|
| JP | 9-284798 | 10/1997 |
| JP | 10-178650 | 6/1998 |
| JP | 10-243407 | 9/1998 |
| JP | 11-215512 | 8/1999 |
| JP | 11-215513 | 8/1999 |
| JP | 11-220751 | 8/1999 |
| JP | 2001-292455 | 10/2001 |
| JP | 2001-352554 | 12/2001 |
| JP | 2002-165226 | 6/2002 |
| JP | 2002-209223 | 7/2002 |
| JP | 2004-172858 | 6/2004 |
| WO | WO 02/056603 A1 | 7/2002 |
| WO | WO 02/056604 A1 | 7/2002 |

\* cited by examiner

*Primary Examiner*—Yubin Hung
(74) *Attorney, Agent, or Firm*—Oblon, Spivak, McClelland, Maier & Neustadt, P.C.

(57) ABSTRACT

In an image processing apparatus, a sensitivity compensation unit converts a color-and-sensitivity mosaic image into a color mosaic image. A pixel-of-interest determination unit extracts local area information from the color mosaic image. An edge-direction detector detects an edge of the local area. A G-component computing unit performs weighted interpolation in the edge direction of the green (G) component associated with a pixel of interest. A statistic computing unit computes statistic information of the local area. A first or second R-and-B-component computing unit computes the red (R) and blue (B) components of the pixel of interest on the basis of the statistic information. An inverse gamma conversion unit performs inverse gamma conversion of the red (R), green (G), and blue (B) components of the pixel of interest. The present invention is applicable to, for example, a digital still camera.

17 Claims, 41 Drawing Sheets

FIG. 3

| $R_1$ | $G_1$ | $B_1$ | $G_1$ | $R_1$ | $G_1$ | $B_1$ | $G_1$ |
|---|---|---|---|---|---|---|---|
| $G_0$ | $B_0$ | $G_0$ | $R_0$ | $G_0$ | $B_0$ | $G_0$ | $R_0$ |
| $B_1$ | $G_1$ | $R_1$ | $G_1$ | $B_1$ | $G_1$ | $R_1$ | $G_1$ |
| $G_0$ | $R_0$ | $G_0$ | $B_0$ | $G_0$ | $R_0$ | $G_0$ | $B_0$ |
| $R_1$ | $G_1$ | $B_1$ | $G_1$ | $R_1$ | $G_1$ | $B_1$ | $G_1$ |
| $G_0$ | $B_0$ | $G_0$ | $R_0$ | $G_0$ | $B_0$ | $G_0$ | $R_0$ |
| $B_1$ | $G_1$ | $R_1$ | $G_1$ | $B_1$ | $G_1$ | $R_1$ | $G_1$ |
| $G_0$ | $R_0$ | $G_0$ | $B_0$ | $G_0$ | $R_0$ | $G_0$ | $B_0$ |

FIG. 4

| $R_1$ | $G_1$ | $R_0$ | $G_1$ | $R_1$ | $G_1$ | $R_0$ | $G_1$ |
|---|---|---|---|---|---|---|---|
| $G_0$ | $B_0$ | $G_0$ | $B_1$ | $G_0$ | $B_0$ | $G_0$ | $B_1$ |
| $R_0$ | $G_1$ | $R_1$ | $G_1$ | $R_0$ | $G_1$ | $R_1$ | $G_1$ |
| $G_0$ | $B_1$ | $G_0$ | $B_0$ | $G_0$ | $B_1$ | $G_0$ | $B_0$ |
| $R_1$ | $G_1$ | $R_0$ | $G_1$ | $R_1$ | $G_1$ | $R_0$ | $G_1$ |
| $G_0$ | $B_0$ | $G_0$ | $B_1$ | $G_0$ | $B_0$ | $G_0$ | $B_1$ |
| $R_0$ | $G_1$ | $R_1$ | $G_1$ | $R_0$ | $G_1$ | $R_1$ | $G_1$ |
| $G_0$ | $B_1$ | $G_0$ | $B_0$ | $G_0$ | $B_1$ | $G_0$ | $B_0$ |

FIG. 5

| $G_1$ | $B_0$ | $G_1$ | $R_0$ | $G_1$ | $B_0$ | $G_1$ | $R_0$ |
|---|---|---|---|---|---|---|---|
| $G_0$ | $R_1$ | $G_0$ | $B_1$ | $G_0$ | $R_1$ | $G_0$ | $B_1$ |
| $G_1$ | $R_0$ | $G_1$ | $B_0$ | $G_1$ | $R_0$ | $G_1$ | $B_0$ |
| $G_0$ | $B_1$ | $G_0$ | $R_1$ | $G_0$ | $B_1$ | $G_0$ | $R_1$ |
| $G_1$ | $B_0$ | $G_1$ | $R_0$ | $G_1$ | $B_0$ | $G_1$ | $R_0$ |
| $G_0$ | $R_1$ | $G_0$ | $B_1$ | $G_0$ | $R_1$ | $G_0$ | $B_1$ |
| $G_1$ | $R_0$ | $G_1$ | $B_0$ | $G_1$ | $R_0$ | $G_1$ | $B_0$ |
| $G_0$ | $B_1$ | $G_0$ | $R_1$ | $G_0$ | $B_1$ | $G_0$ | $R_1$ |

FIG. 6

| $G_1$ | $B_1$ | $G_1$ | $B_0$ | $G_1$ | $B_1$ | $G_1$ | $B_0$ |
|---|---|---|---|---|---|---|---|
| $G_0$ | $R_1$ | $G_0$ | $R_0$ | $G_0$ | $R_1$ | $G_0$ | $R_0$ |
| $G_1$ | $B_0$ | $G_1$ | $B_1$ | $G_1$ | $B_0$ | $G_1$ | $B_1$ |
| $G_0$ | $R_0$ | $G_0$ | $R_1$ | $G_0$ | $R_0$ | $G_0$ | $R_1$ |
| $G_1$ | $B_1$ | $G_1$ | $B_0$ | $G_1$ | $B_1$ | $G_1$ | $B_0$ |
| $G_0$ | $R_1$ | $G_0$ | $R_0$ | $G_0$ | $R_1$ | $G_0$ | $R_0$ |
| $G_1$ | $B_0$ | $G_1$ | $B_1$ | $G_1$ | $B_0$ | $G_1$ | $B_1$ |
| $G_0$ | $R_0$ | $G_0$ | $R_1$ | $G_0$ | $R_0$ | $G_0$ | $R_1$ |

FIG. 7

| $G_1$ | $B_1$ | $G_1$ | $R_1$ | $G_1$ | $B_1$ | $G_1$ | $R_1$ |
|---|---|---|---|---|---|---|---|
| $G_0$ | $B_0$ | $G_0$ | $R_0$ | $G_0$ | $B_0$ | $G_0$ | $R_0$ |
| $G_1$ | $R_1$ | $G_1$ | $B_1$ | $G_1$ | $R_1$ | $G_1$ | $B_1$ |
| $G_0$ | $R_0$ | $G_0$ | $B_0$ | $G_0$ | $R_0$ | $G_0$ | $B_0$ |
| $G_1$ | $B_1$ | $G_1$ | $R_1$ | $G_1$ | $B_1$ | $G_1$ | $R_1$ |
| $G_0$ | $B_0$ | $G_0$ | $R_0$ | $G_0$ | $B_0$ | $G_0$ | $R_0$ |
| $G_1$ | $R_1$ | $G_1$ | $B_1$ | $G_1$ | $R_1$ | $G_1$ | $B_1$ |
| $G_0$ | $R_0$ | $G_0$ | $B_0$ | $G_0$ | $R_0$ | $G_0$ | $B_0$ |

FIG. 8

| $M_1$ | $Y_1$ | $M_0$ | $Y_0$ | $M_1$ | $Y_1$ | $M_0$ | $Y_0$ |
|---|---|---|---|---|---|---|---|
| $G_1$ | $C_1$ | $G_0$ | $C_0$ | $G_1$ | $C_1$ | $G_0$ | $C_0$ |
| $M_0$ | $Y_0$ | $M_1$ | $Y_1$ | $M_0$ | $Y_0$ | $M_1$ | $Y_1$ |
| $G_0$ | $C_0$ | $G_1$ | $C_1$ | $G_0$ | $C_0$ | $G_1$ | $C_1$ |
| $M_1$ | $Y_1$ | $M_0$ | $Y_0$ | $M_1$ | $Y_1$ | $M_0$ | $Y_0$ |
| $G_1$ | $C_1$ | $G_0$ | $C_0$ | $G_1$ | $C_1$ | $G_0$ | $C_0$ |
| $M_0$ | $Y_0$ | $M_1$ | $Y_1$ | $M_0$ | $Y_0$ | $M_1$ | $Y_1$ |
| $G_0$ | $C_0$ | $G_1$ | $C_1$ | $G_0$ | $C_0$ | $G_1$ | $C_1$ |

FIG. 9

| $Y_1$ | $M_0$ | $G_1$ | $C_0$ | $Y_1$ | $M_0$ | $G_1$ | $C_0$ |
|---|---|---|---|---|---|---|---|
| $Y_0$ | $C_1$ | $G_0$ | $M_1$ | $Y_0$ | $C_1$ | $G_0$ | $M_1$ |
| $G_1$ | $C_0$ | $Y_1$ | $M_0$ | $G_1$ | $C_0$ | $Y_1$ | $M_0$ |
| $G_0$ | $M_1$ | $Y_0$ | $C_1$ | $G_0$ | $M_1$ | $Y_0$ | $C_1$ |
| $Y_1$ | $M_0$ | $G_1$ | $C_0$ | $Y_1$ | $M_0$ | $G_1$ | $C_0$ |
| $Y_0$ | $C_1$ | $G_0$ | $M_1$ | $Y_0$ | $C_1$ | $G_0$ | $M_1$ |
| $G_1$ | $C_0$ | $Y_1$ | $M_0$ | $G_1$ | $C_0$ | $Y_1$ | $M_0$ |
| $G_0$ | $M_1$ | $Y_0$ | $C_1$ | $G_0$ | $M_1$ | $Y_0$ | $C_1$ |

FIG. 10

| $G_2$ | $R_2$ | $B_2$ | $G_2$ | $R_2$ | $B_2$ |
|---|---|---|---|---|---|
| $G_1$ | $R_1$ | $B_1$ | $G_1$ | $R_1$ | $B_1$ |
| $G_0$ | $R_0$ | $B_0$ | $G_0$ | $R_0$ | $B_0$ |
| $G_2$ | $R_2$ | $B_2$ | $G_2$ | $R_2$ | $B_2$ |
| $G_1$ | $R_1$ | $B_1$ | $G_1$ | $R_1$ | $B_1$ |
| $G_0$ | $R_0$ | $B_0$ | $G_0$ | $R_0$ | $B_0$ |

FIG. 11

| $B_2$ | $R_0$ | $G_1$ | $B_2$ | $R_0$ | $G_1$ |
|---|---|---|---|---|---|
| $R_1$ | $G_2$ | $B_0$ | $R_1$ | $G_2$ | $B_0$ |
| $G_0$ | $B_1$ | $R_2$ | $G_0$ | $B_1$ | $R_2$ |
| $B_2$ | $R_0$ | $G_1$ | $B_2$ | $R_0$ | $G_1$ |
| $R_1$ | $G_2$ | $B_0$ | $R_1$ | $G_2$ | $B_0$ |
| $G_0$ | $B_1$ | $R_2$ | $G_0$ | $B_1$ | $R_2$ |

FIG. 12

| $B_3$ | $G_2$ | $B_0$ | $G_3$ | $B_3$ | $G_2$ | $B_0$ | $G_3$ |
|---|---|---|---|---|---|---|---|
| $G_1$ | $R_2$ | $G_0$ | $R_1$ | $G_1$ | $R_2$ | $G_0$ | $R_1$ |
| $B_1$ | $G_3$ | $B_2$ | $G_2$ | $B_1$ | $G_3$ | $B_2$ | $G_2$ |
| $G_0$ | $R_0$ | $G_1$ | $R_3$ | $G_0$ | $R_0$ | $G_1$ | $R_3$ |
| $B_3$ | $G_2$ | $B_0$ | $G_3$ | $B_3$ | $G_2$ | $B_0$ | $G_3$ |
| $G_1$ | $R_2$ | $G_0$ | $R_1$ | $G_1$ | $R_2$ | $G_0$ | $R_1$ |
| $B_1$ | $G_3$ | $B_2$ | $G_2$ | $B_1$ | $G_3$ | $B_2$ | $G_2$ |
| $G_0$ | $R_0$ | $G_1$ | $R_3$ | $G_0$ | $R_0$ | $G_1$ | $R_3$ |

FIG. 13

| $B_3$ | $G_1$ | $B_0$ | $G_2$ | $B_3$ | $G_1$ | $B_0$ | $G_2$ |
|---|---|---|---|---|---|---|---|
| $G_2$ | $R_2$ | $G_1$ | $R_1$ | $G_2$ | $R_2$ | $G_1$ | $R_1$ |
| $B_1$ | $G_3$ | $B_2$ | $G_0$ | $B_1$ | $G_3$ | $B_2$ | $G_0$ |
| $G_0$ | $R_0$ | $G_3$ | $R_3$ | $G_0$ | $R_0$ | $G_3$ | $R_3$ |
| $B_3$ | $G_1$ | $B_0$ | $G_2$ | $B_3$ | $G_1$ | $B_0$ | $G_2$ |
| $G_2$ | $R_2$ | $G_1$ | $R_1$ | $G_2$ | $R_2$ | $G_1$ | $R_1$ |
| $B_1$ | $G_3$ | $B_2$ | $G_0$ | $B_1$ | $G_3$ | $B_2$ | $G_0$ |
| $G_0$ | $R_0$ | $G_3$ | $R_3$ | $G_0$ | $R_0$ | $G_3$ | $R_3$ |

FIG. 14

| $G_3$ | $G_1$ | $R_3$ | $B_1$ | $G_3$ | $G_1$ | $R_3$ | $B_1$ |
|---|---|---|---|---|---|---|---|
| $R_0$ | $B_2$ | $G_0$ | $G_2$ | $R_0$ | $B_2$ | $G_0$ | $G_2$ |
| $B_3$ | $R_1$ | $G_3$ | $G_1$ | $B_3$ | $R_1$ | $G_3$ | $G_1$ |
| $G_0$ | $G_2$ | $B_0$ | $R_2$ | $G_0$ | $G_2$ | $B_0$ | $R_2$ |
| $G_3$ | $G_1$ | $R_3$ | $B_1$ | $G_3$ | $G_1$ | $R_3$ | $B_1$ |
| $R_0$ | $B_2$ | $G_0$ | $G_2$ | $R_0$ | $B_2$ | $G_0$ | $G_2$ |
| $B_3$ | $R_1$ | $G_3$ | $G_1$ | $B_3$ | $R_1$ | $G_3$ | $G_1$ |
| $G_0$ | $G_2$ | $B_0$ | $R_2$ | $G_0$ | $G_2$ | $B_0$ | $R_2$ |

FIG. 15

| M$_2$ | Y$_1$ | M$_3$ | Y$_0$ | M$_2$ | Y$_1$ | M$_3$ | Y$_0$ |
|---|---|---|---|---|---|---|---|
| G$_2$ | C$_1$ | G$_3$ | C$_0$ | G$_2$ | C$_1$ | G$_3$ | C$_0$ |
| M$_0$ | Y$_3$ | M$_1$ | Y$_2$ | M$_0$ | Y$_3$ | M$_1$ | Y$_2$ |
| G$_0$ | C$_3$ | G$_1$ | C$_2$ | G$_0$ | C$_3$ | G$_1$ | C$_2$ |
| M$_2$ | Y$_1$ | M$_3$ | Y$_0$ | M$_2$ | Y$_1$ | M$_3$ | Y$_0$ |
| G$_2$ | C$_1$ | G$_3$ | C$_0$ | G$_2$ | C$_1$ | G$_3$ | C$_0$ |
| M$_0$ | Y$_3$ | M$_1$ | Y$_2$ | M$_0$ | Y$_3$ | M$_1$ | Y$_2$ |
| G$_0$ | C$_3$ | G$_1$ | C$_2$ | G$_0$ | C$_3$ | G$_1$ | C$_2$ |

FIG. 16

| C$_2$ | M$_1$ | G$_2$ | Y$_1$ | C$_2$ | M$_1$ | G$_2$ | Y$_1$ |
|---|---|---|---|---|---|---|---|
| M$_0$ | C$_3$ | Y$_0$ | G$_3$ | M$_0$ | C$_3$ | Y$_0$ | G$_3$ |
| Y$_2$ | G$_1$ | M$_2$ | C$_1$ | Y$_2$ | G$_1$ | M$_2$ | C$_1$ |
| G$_0$ | Y$_3$ | C$_0$ | M$_3$ | G$_0$ | Y$_3$ | C$_0$ | M$_3$ |
| C$_2$ | M$_1$ | G$_2$ | Y$_1$ | C$_2$ | M$_1$ | G$_2$ | Y$_1$ |
| M$_0$ | C$_3$ | Y$_0$ | G$_3$ | M$_0$ | C$_3$ | Y$_0$ | G$_3$ |
| Y$_2$ | G$_1$ | M$_2$ | C$_1$ | Y$_2$ | G$_1$ | M$_2$ | C$_1$ |
| G$_0$ | Y$_3$ | C$_0$ | M$_3$ | G$_0$ | Y$_3$ | C$_0$ | M$_3$ |

FIG. 26

| OR | OR | OR | OR | OR | OR | OR | OR |
|---|---|---|---|---|---|---|---|
| AND | AND | AND | AND | AND | AND | AND | AND |
| OR | OR | OR | OR | OR | OR | OR | OR |
| AND | AND | AND | AND | AND | AND | AND | AND |
| OR | OR | OR | OR | OR | OR | OR | OR |
| AND | AND | AND | AND | AND | AND | AND | AND |
| OR | OR | OR | OR | OR | OR | OR | OR |
| AND | AND | AND | AND | AND | AND | AND | AND |

FIG. 27

| OR | OR | AND | OR | OR | OR | AND | OR |
|---|---|---|---|---|---|---|---|
| AND | AND | AND | OR | AND | AND | AND | OR |
| AND | OR | OR | OR | AND | OR | OR | OR |
| AND | OR | AND | AND | AND | OR | AND | AND |
| OR | OR | AND | OR | OR | OR | AND | OR |
| AND | AND | AND | OR | AND | AND | AND | OR |
| AND | OR | OR | OR | AND | OR | OR | OR |
| AND | OR | AND | AND | AND | OR | AND | AND |

FIG. 28

| OR | AND | OR | AND | OR | AND | OR | AND |
|----|-----|----|-----|----|-----|----|-----|
| AND | OR | AND | OR | AND | OR | AND | OR |
| OR | AND | OR | AND | OR | AND | OR | AND |
| AND | OR | AND | OR | AND | OR | AND | OR |
| OR | AND | OR | AND | OR | AND | OR | AND |
| AND | OR | AND | OR | AND | OR | AND | OR |
| OR | AND | OR | AND | OR | AND | OR | AND |
| AND | OR | AND | OR | AND | OR | AND | OR |

FIG. 29

| OR | OR | OR | AND | OR | OR | OR | AND |
|----|----|----|-----|----|----|----|-----|
| AND | OR | AND | AND | AND | OR | AND | AND |
| OR | AND | OR | OR | OR | AND | OR | OR |
| AND | AND | AND | OR | AND | AND | AND | OR |
| OR | OR | OR | AND | OR | OR | OR | AND |
| AND | OR | AND | AND | AND | OR | AND | AND |
| OR | AND | OR | OR | OR | AND | OR | OR |
| AND | AND | AND | OR | AND | AND | AND | OR |

FIG. 30

| OR | OR | OR | OR | OR | OR | OR | OR |
|---|---|---|---|---|---|---|---|
| AND | AND | AND | AND | AND | AND | AND | AND |
| OR | OR | OR | OR | OR | OR | OR | OR |
| AND | AND | AND | AND | AND | AND | AND | AND |
| OR | OR | OR | OR | OR | OR | OR | OR |
| AND | AND | AND | AND | AND | AND | AND | AND |
| OR | OR | OR | OR | OR | OR | OR | OR |
| AND | AND | AND | AND | AND | AND | AND | AND |

|  -1 | 0 | 1 |
|---|---|---|
| -2 | 0 | 2 |
| -1 | 0 | 1 |

FIG. 38B

| 1 | 2 | 1 |
|---|---|---|
| 0 | 0 | 0 |
| -1 | -2 | -1 |

FIG. 43A

| B | G | B |
|---|---|---|
| G | B | G |
| B | G | B |

FIG. 43B

| R | G | R |
|---|---|---|
| G | R | G |
| R | G | R |

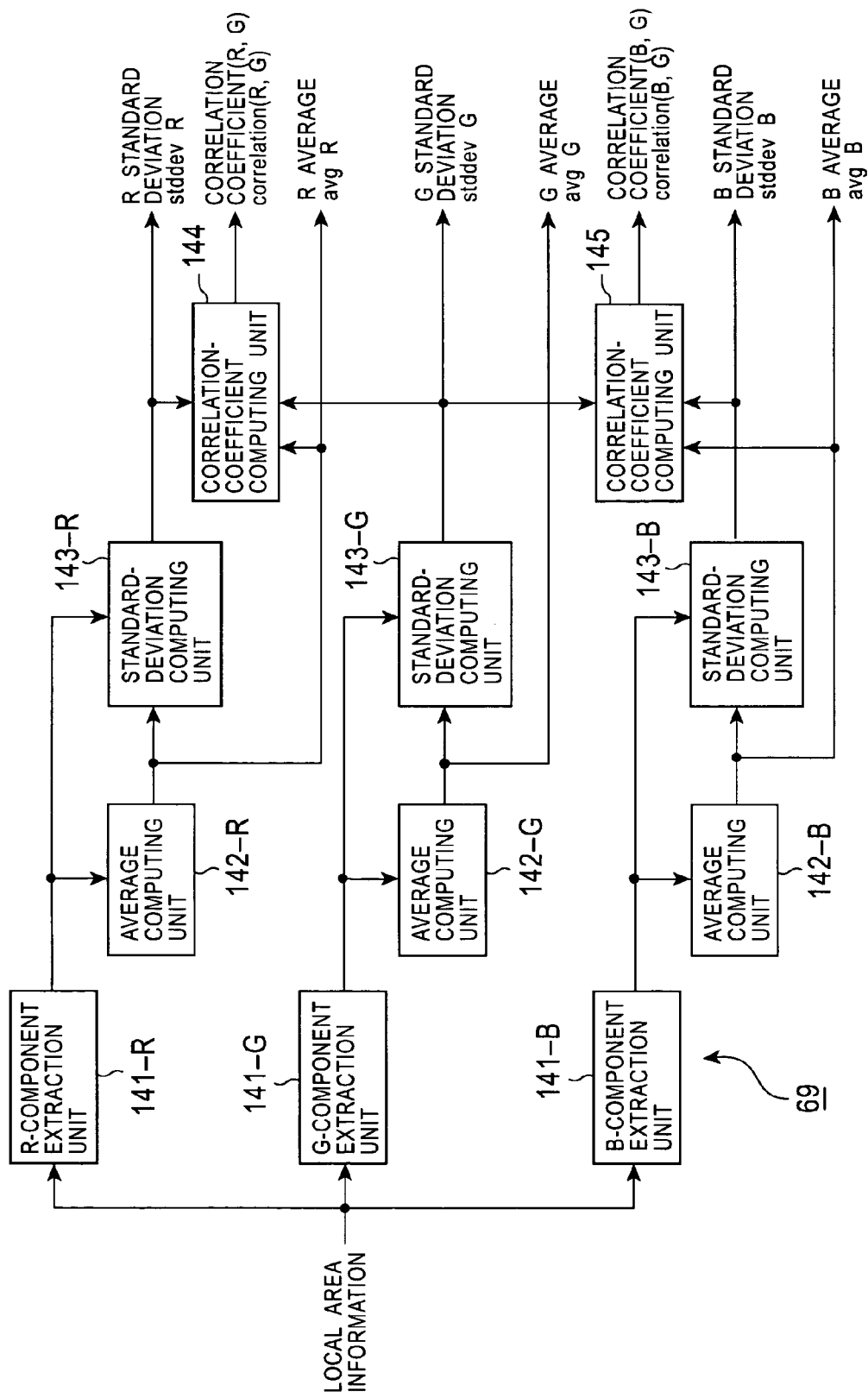

IMAGE PROCESSING APPARATUS AND METHOD, RECORDING MEDIUM, AND PROGRAM

BACKGROUND OF THE INVENTION

1. Field of the Invention

The present invention relates to image processing apparatuses and methods, recording media, and programs, and more particularly relates to an image processing apparatus and method suitable for use in generating a wide dynamic range color image including a plurality of pixels having wide dynamic range color components on the basis of a color-and-sensitivity mosaic image including pixels, each pixel having a color component differing from that of a neighboring pixel and being captured with a sensitivity differing from that with which the neighboring pixel is captured, to a recording medium, and to a program.

2. Description of the Related Art

Solid-state image devices, such as CCDs (Charge Coupled Devices) and CMOS's (Complementary Metal-Oxide Semiconductors), are widely used in image capturing apparatuses, such as video cameras and digital still cameras, component inspectors in the field of factory automation (FA), and optical measuring instruments, such as electronic endoscopes in the field of medical electronics (ME).

There are known techniques that combine optical intensity signals generated by measurement with different sensitivities at individual pixels, thereby improving the dynamic range of an image capturing apparatus using a solid-state image device or the like. Five such known techniques will now be described.

A first known technique is a method of optically measuring incident light rays split into a plurality of optical axes having different transmittances by solid-state image devices disposed on the individual optical axes (e.g., see Japanese Unexamined Patent Application Publication No. 8-223491). According to the first known technique, a plurality of solid-state image devices and a complicated optical system for splitting light rays are necessary. This is disadvantageous in terms of cost and size reduction.

A second known technique is a method of capturing, by a single solid-state image device, a plurality of images by splitting exposure time into a plurality of periods and then combining the captured images (e.g., see Japanese Unexamined Patent Application Publication No. 8-331461). According to the second known technique, pieces of information generated by measurement with different sensitivities are those captured at different times in which the corresponding exposure time periods are of different lengths. A dynamic scene in which optical intensity changes from time to time cannot be captured accurately.

A third known technique is a method of capturing an image by a single solid-state image device in which each pair of adjacent photo sensors on an image capturing side of the solid-state image device is associated with one pixel of an output image, and the paired adjacent photo sensors are set to different sensitivities (e.g., see Japanese Unexamined Patent Application Publication No. 59-217358). The sensitivities of photo sensors of the solid-state image device may be changed by covering the individual photo sensors with filters having different transmittances.

The third known technique is advantageous over the first known technique for cost and space reduction. The third known technique is advantageous over the second known technique in that the former can accurately capture a dynamic scene. According to the third known technique, each pair of adjacent photo sensors is associated with one pixel of the output image. To ensure the resolution of the output image, an image device including photo sensors, the number of which is several times the number of pixels of the output image, is necessary. The unit cell size is thus increased.

A fourth known technique is a method of generating a wide dynamic range image signal by applying a mechanism in which each photo sensor associated with one pixel of an output image has a different exposure to a normal dynamic range image device and performing predetermined image processing on a generated image signal. The mechanism in which each photo sensor has a different exposure is achieved by generating a spatial sensitivity pattern by changing the light transmittance and/or aperture of each photo sensor (e.g., see S. K. Nayar and T. Mitsunaga, "High Dynamic Range Imaging: Spatially Varying Pixel Exposures", Proc. of Computer Vision and Pattern Recognition 2000, Vol. 1, pp. 472-479, June, 2000).

According to the fourth known technique, each photo sensor has one type of sensitivity. Although each pixel of a captured image has information with a dynamic range intrinsic in the image device, a wide dynamic range image can be generated by performing predetermined image processing on a generated image signal so that all pixels have a uniform sensitivity. Since all photo sensors are exposed at the same time, a dynamic subject can be captured accurately. Since each photo sensor is associated with one pixel of the output image, the unit cell size is not increased.

The fourth known technique is based on the assumption that a monochrome image is to be generated. A technique for generating a color image is not established yet.

A fifth known technique is a method of capturing a wide dynamic range color image signal by applying a mechanism in which each photo sensor associated with one pixel of an output image has a different exposure and outputs a color component differing from that of an adjacent photo sensor to a normal dynamic range image device and performing predetermined image processing on a generated color-and-sensitivity mosaic image. The mechanism in which each photo sensor outputs a color component differing from that of an adjacent photo sensor is achieved by covering the individual photo sensors with color filters (e.g., see Japanese Unexamined Patent Application Publication No. 2002-209223).

According to the fifth known technique, a wide dynamic range color image can be generated by performing predetermined image processing on a captured color-and-sensitivity mosaic image. In the course of image processing, computations must be done to generate a brightness image in which each pixel has a brightness signal and a color difference image in which each pixel has a color difference signal. A memory for storing these images is thus necessary. There is a demand for reducing the computations and circuit size.

SUMMARY OF THE INVENTION

Accordingly, it is an object of the present invention to generate a wide dynamic range color image on the basis of a color-and-sensitivity mosaic image by reducing the computations and the circuit size by reducing the number of frame memories used.

According to an aspect of the present invention, there is provided an image processing apparatus for generating a color image in which each pixel has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity. The image processing apparatus includes an extraction unit for extracting a predetermined area centered on a pixel of interest, which is an object to be processed, from the color-and-sensitivity mosaic image; a generation unit for making uniform the sensitivity characteristics relative to the optical intensity of pixels included in the predetermined area extracted by the extraction unit and generating local area information including the pixels, each pixel having one of the plurality of color components and the uniform sensitivity characteristic relative to the optical intensity; an edge detection unit for detecting an edge of the local area information on the basis of, of the pixels included in the local area information, pixels having a first color component; a first interpolation unit for interpolating the first color component associated with the pixel of interest by computing a weighted average using, of the pixels included in the local area information, the pixels having the first color component on the basis of the direction of the edge detected by the edge detection unit; a statistic-information computing unit for computing statistic information on the basis of the pixels included in the local area information; and a second interpolation unit for interpolating a color component other than the first color component associated with the pixel of interest on the basis of the first color component associated with the pixel of interest, which is interpolated by the first interpolation unit, and the statistic information.

The image processing apparatus may further include a defective-pixel interpolation unit for interpolating a defective pixel included in the local area information using pixels neighboring the defective pixel.

The statistic-information computing unit may compute, as the statistic information, at least one of the average of each color component, standard deviation of each color component, and a correlation coefficient between the first color component and the other color component on the basis of the pixels included in the local area information.

The second interpolation unit may interpolate the color component other than the first color component associated with the pixel of interest on the basis of the first color component associated with the pixel of interest, which is interpolated by the first interpolation unit, and the average of each color component, the standard deviation of each color component, and the correlation coefficient between the first color component and the other color component, which are computed by the statistic-information computing unit.

The second interpolation unit may interpolate the color component other than the first color component associated with the pixel of interest on the basis of the first color component associated with the pixel of interest, which is interpolated by the first interpolation unit, and the average of the color component other than the first color component, which is computed by the statistic-information computing unit.

The second interpolation unit may include a first computation unit for computing the color component other than the first color component associated with the pixel of interest on the basis of the first color component associated with the pixel of interest, which is interpolated by the first interpolation unit, and the average of each color component, the standard deviation of each color component, and the correlation coefficient between the first color component and the other color component, which are computed by the statistic-information computing unit; and a second computation unit for computing the color component other than the first color component associated with the pixel of interest on the basis of the first color component associated with the pixel of interest, which is interpolated by the first interpolation unit, and the average of the color component other than the first color component, which is computed by the statistic-information computing unit. One of the first computation unit and the second computation unit may be selected to interpolate the color component other than the first color component associated with the pixel of interest.

The second interpolation unit may select one of the first computation unit and the second computation unit on the basis of the standard deviation of the first color component, which is computed by the statistic-information computing unit, to interpolate the color component other than the first color component associated with the pixel of interest.

The image processing apparatus may further include a gamma conversion unit for performing gamma conversion of the pixels included in the local area information; and an inverse gamma conversion unit for performing inverse gamma conversion of the first color component associated with the pixel of interest, which is interpolated by the first interpolation unit, and the color component other than the first color component associated with the pixel of interest, which is interpolated by the second interpolation unit.

The first color component may be a color component that statistically has the highest signal level of the plurality of color components.

The first color component may be a color component that occupies the largest portion of the color mosaic image of the plurality of color components.

According to an aspect of the present invention, there is provided an image processing method for generating a color image in which each pixel has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity. The method includes an extraction step of extracting a predetermined area centered on a pixel of interest, which is an object to be processed, from the color-and-sensitivity mosaic image; a generation step of making uniform the sensitivity characteristics relative to the optical intensity of pixels included in the predetermined area extracted in the extraction step and generating local area information including the pixels, each pixel having one of the plurality of color components and the uniform sensitivity characteristic relative to the optical intensity; an edge detection step of detecting an edge of the local area information on the basis of, of the pixels included in the local area information, pixels having a first color component; a first interpolation step of interpolating the first color component associated with the pixel of interest by computing a weighted average using, of the pixels included in the local area information, the pixels having the first color component on the basis of the direction of the edge detected in the edge detection step; a statistic-information computing step of computing statistic information on the basis of the pixels included in the local area information; and a second interpolation step of interpolating a color component other than the first color component associated with the pixel of interest on the basis of the first color component associated with the pixel of interest, which is interpolated in the first interpolation step, and the statistic information.

According to an aspect of the present invention, there is provided a recording medium having a computer-readable program recorded thereon for generating a color image in which each pixel has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity. The program includes an extraction step of extracting a predetermined area centered on a pixel of interest, which is an object to be processed, from the color-and-sensitivity mosaic image; a generation step of making uniform the sensitivity characteristics relative to the optical intensity of pixels included in the predetermined area extracted in the extraction step and generating local area information including the pixels, each pixel having one of the plurality of color components and the uniform sensitivity characteristic relative to the optical intensity; an edge detection step of detecting an edge of the local area information on the basis of, of the pixels included in the local area information, pixels having a first color component; a first interpolation step of interpolating the first color component associated with the pixel of interest by computing a weighted average using, of the pixels included in the local area information, the pixels having the first color component on the basis of the direction of the edge detected in the edge detection step; a statistic-information computing step of computing statistic information on the basis of the pixels included in the local area information; and a second interpolation step of interpolating a color component other than the first color component associated with the pixel of interest on the basis of the first color component associated with the pixel of interest, which is interpolated in the first interpolation step, and the statistic information.

According to an aspect of the present invention, there is provided a program for generating a color image in which each pixel has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity. The program causing a computer to perform a process including an extraction step of extracting a predetermined area centered on a pixel of interest, which is an object to be processed, from the color-and-sensitivity mosaic image; a generation step of making uniform the sensitivity characteristics relative to the optical intensity of pixels included in the predetermined area extracted in the extraction step and generating local area information including the pixels, each pixel having one of the plurality of color components and the uniform sensitivity characteristic relative to the optical intensity; an edge detection step of detecting an edge of the local area information on the basis of, of the pixels included in the local area information, pixels having a first color component; a first interpolation step of interpolating the first color component associated with the pixel of interest by computing a weighted average using, of the pixels included in the local area information, the pixels having the first color component on the basis of the direction of the edge detected in the edge detection step; a statistic-information computing step of computing statistic information on the basis of the pixels included in the local area information; and a second interpolation step of interpolating a color component other than the first color component associated with the pixel of interest on the basis of the first color component associated with the pixel of interest, which is interpolated in the first interpolation step, and the statistic information.

According to an image processing apparatus and method and to a program of the present invention, a predetermined area centered on a pixel of interest, which is an object to be processed, is extracted from a color-and-sensitivity mosaic image. Sensitivity characteristics relative to optical intensity of pixels included in the extracted predetermined area are made uniform, and local area information is generated including pixels, each pixel having one of a plurality of color components and a uniform sensitivity characteristic relative to the optical intensity. An edge of the local area information is detected on the basis of, of the pixels included in the local area information, pixels having a first color component. On the basis of the direction of the detected edge, the first color component associated with the pixel of interest is interpolated by computing a weighted average using, of the pixels included in the local area information, the pixels having the first color component. Statistic information is computed on the basis of the pixels included in the local area information. A color component other than the first color component associated with the pixel of interest is interpolated on the basis of the interpolated first color component associated with the pixel of interest and the statistic information.

According to the present invention, a wide dynamic range color image is generated from a color-and-sensitivity mosaic image by reducing computations and the number of frame memories used.

BRIEF DESCRIPTION OF THE DRAWINGS

FIG. 3 shows color-and-sensitivity mosaic pattern P1;
FIG. 4 shows color-and-sensitivity mosaic pattern P2;
FIG. 5 shows color-and-sensitivity mosaic pattern P3;
FIG. 6 shows color-and-sensitivity mosaic pattern P4;
FIG. 7 shows color-and-sensitivity mosaic pattern P5;
FIG. 8 shows color-and-sensitivity mosaic pattern P6;
FIG. 9 shows color-and-sensitivity mosaic pattern P7;
FIG. 10 shows color-and-sensitivity mosaic pattern P8;
FIG. 11 shows color-and-sensitivity mosaic pattern P9;
FIG. 12 shows color-and-sensitivity mosaic pattern P10;
FIG. 13 shows color-and-sensitivity mosaic pattern P11;
FIG. 14 shows color-and-sensitivity mosaic pattern P12;
FIG. 15 shows color-and-sensitivity mosaic pattern P13;
FIG. 16 shows color-and-sensitivity mosaic pattern P14;
FIG. 26 shows assorted OR and AND electrode structures for achieving color-and-sensitivity mosaic pattern P1;

FIG. 27 shows assorted OR and AND electrode structures for achieving color-and-sensitivity mosaic pattern P2;

FIG. 28 shows assorted OR and AND electrode structures for achieving color-and-sensitivity mosaic pattern P3;

FIG. 29 shows assorted OR and AND electrode structures for achieving color-and-sensitivity mosaic pattern P4;

FIG. 30 shows assorted OR and AND electrode structures for achieving color-and-sensitivity mosaic pattern P5;

FIGS. 34A to 34C each show the positions of pixels extracted by a neighboring-pixel extraction unit of the defective-pixel interpolation unit;

FIGS. 38A and 38B show examples of gradient operators used by a gradient computing unit shown in FIG. 36;

FIGS. 43A and 43B each show the positions of pixels extracted by a G-component extraction unit shown in FIG. 43;

FIG. 44 is a block diagram of an example of the structure of a statistic computing unit shown in FIG. 31;

DESCRIPTION OF THE PREFERRED EMBODIMENTS

Figure 1:
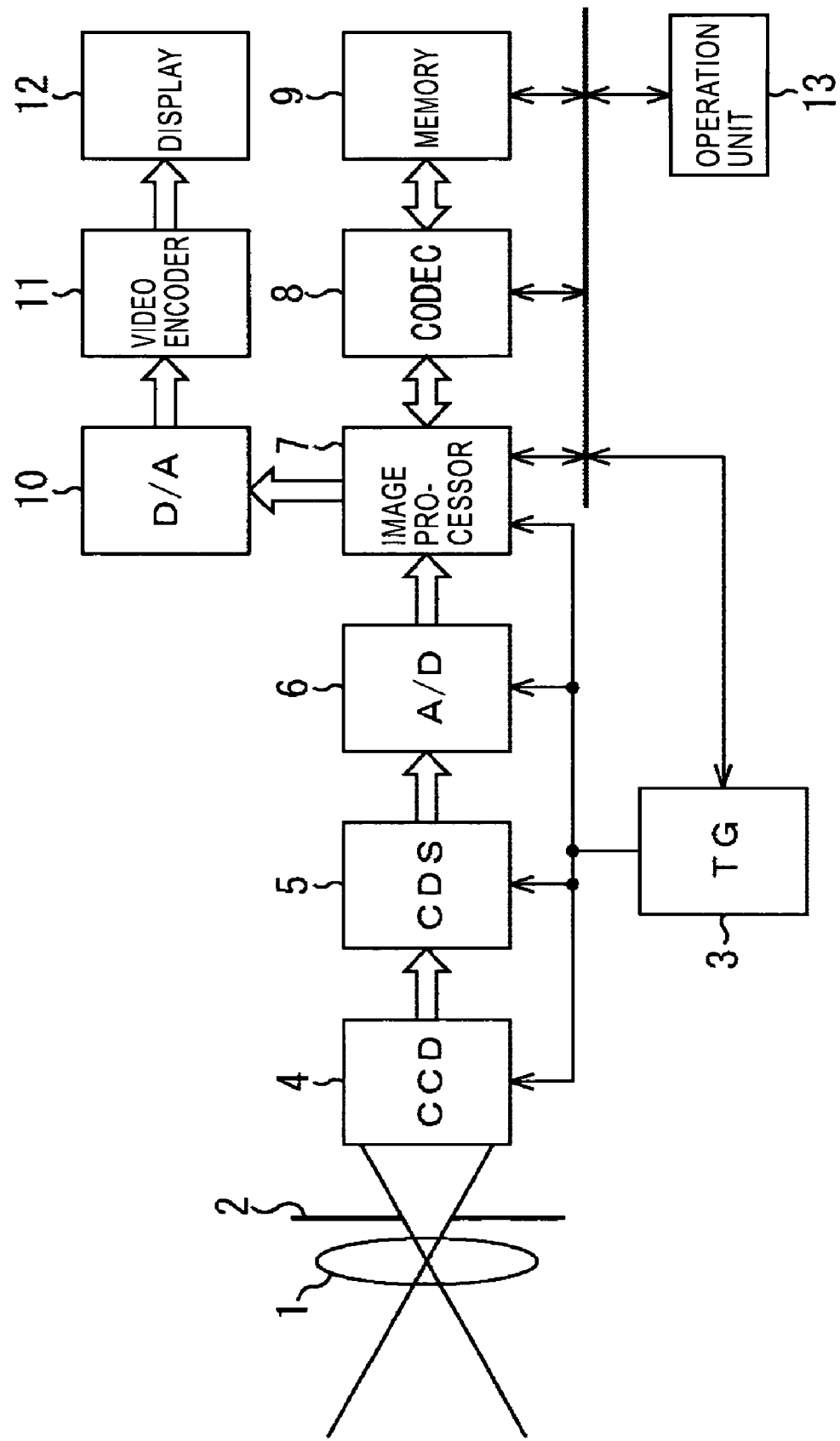
FIG. 1 is a block diagram of an example of the structure of a digital still camera according to an embodiment of the present invention.

FIG. 1 shows an example of the structure of a digital still camera according to an embodiment of the present invention. This digital still camera largely consists of an optical system, a signal processing system, a recording system, a display system, and a control system.

The optical system of the digital still camera includes a lens 1 that converges, or brings together, rays of light to form an optical image of a subject; an aperture 2 that adjusts the amount of light of the optical image; and a single-board CCD image sensor 4 that performs photo-electric conversion of the optical image into a wide dynamic range electrical signal.

The signal processing system includes a correlated double sampling (CDS) circuit 5 that samples the electrical signal from the CCD image sensor 4 to reduce noise; an analog-to-digital (A/D) converter 6 that performs A/D conversion of an analog signal output from the correlated double sampling circuit 5; and an image processor 7 that demosaics a digital signal received from the A/D converter 6 to generate a wide dynamic range color image. Demosaicing by the image processor 7 will be described in detail later.

The recording system includes a CODEC (Compression/Decompression) 8 that encodes the wide dynamic range color image generated by the image processor 7 and records the encoded image in a memory 9 or that reads encoded data stored in the memory 9, decodes the encoded data, and supplies the decoded data to the image processor 7; and the memory 9, which stores the encoded wide dynamic range color image.

The display system includes a digital-to-analog (D/A) converter 10 that performs D/A conversion of an image signal output from the image processor 7; a video encoder 11 that encodes an analog image signal into a video signal (e.g., NTSC signal) in a format suitable for a display 12 at a subsequent stage; and the display 12 including an LCD (Liquid Crystal Display) functioning as a finder or an image monitor by displaying an image associated with the received video signal.

The control system includes a timing generator (TG) 3 that controls the operation timing of the components including the CCD image sensor 4 to the image processor 7; and an operation unit 13 operated by a user to control the shutter timing or to enter other commands.

In the digital still camera, an optical image of a subject (incident light) enters the CCD image sensor 4 via the lens 1 and the aperture 2. The CCD image sensor 4 performs photo-electric conversion to generate an electrical signal, from which noise is removed by the correlated double sampling circuit 5. The noise-removed signal is digitized by the A/D converter 6 and temporarily stored in a built-in image memory in the image processor 7.

Since the signal processing system is under control of the timing generator 3 in the normal state, an image signal in the built-in image memory in the image processor 7 is over-written at a constant frame rate. The image signal in the built-in image memory in the image processor 7 is reduced in size by decimation or the like and supplied to the D/A converter 10. The reduced signal is converted by the D/A converter 10 into an analog signal, and this analog signal is converted by the video encoder 11 into a video signal. An image associated with the video signal is displayed on the display 12, which also acts as a finder.

When the user presses a shutter button included in the operation unit 13, the timing generator 3 imports an image signal generated immediately after the shutter button has been pressed. Subsequently, the signal processing system is controlled not to overwrite the image signal in the image memory in the image processor 7. Then, image data written in the image memory in the image processor 7 is encoded by the CODEC 8 and recorded in the memory 9. With the above-described operation of the digital still camera, one piece of image data is completely imported.

Figure 2:
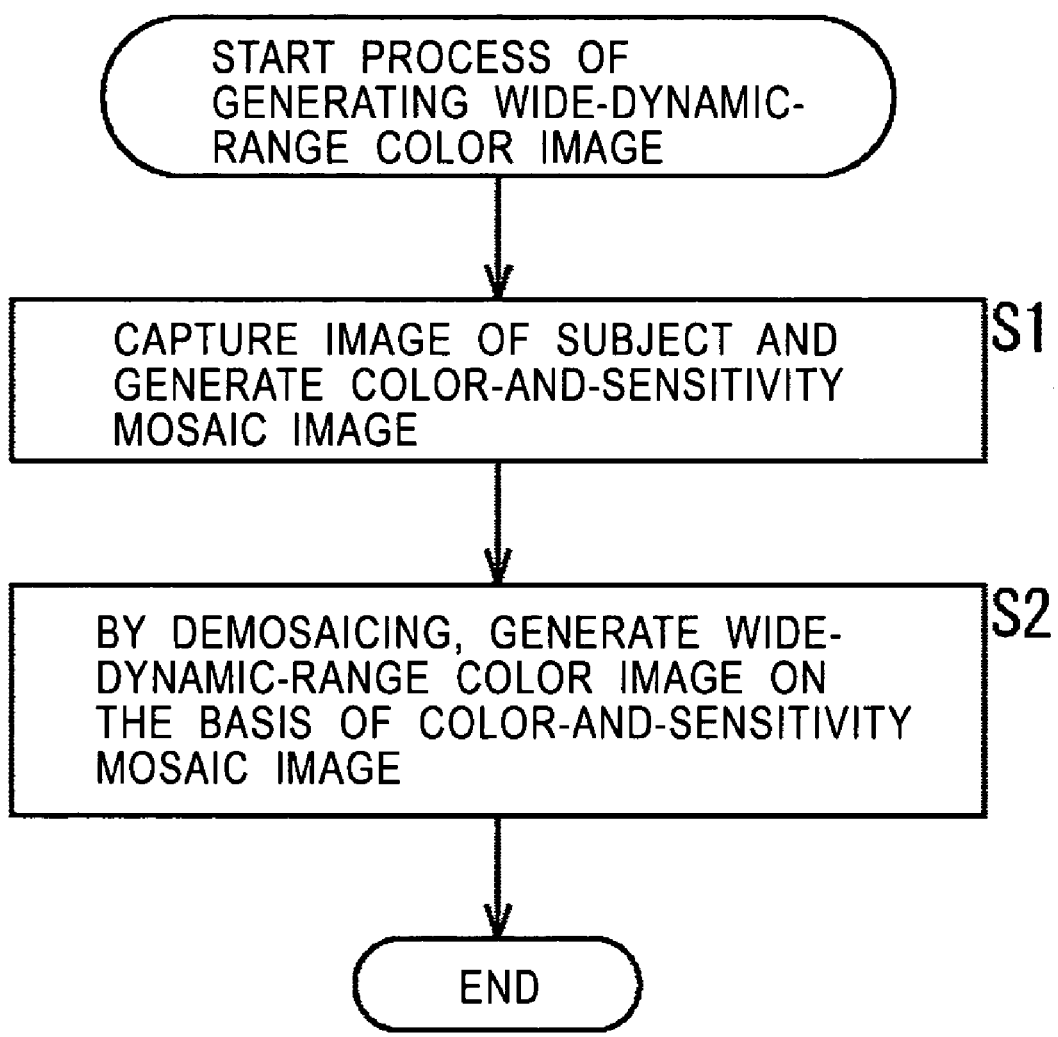
FIG. 2 is a flowchart describing the schematic operation of the digital still camera shown in FIG. 1.

Referring to the flowchart of FIG. 2, the schematic operation of the digital still camera will now be described. In step S1, an image of a subject is captured by the optical system, mainly including the CCD image sensor 4, in which individual pixels have different colors and sensitivities, thereby generating a mosaic image of colors and sensitivities (hereinafter referred to as a color-and-sensitivity mosaic image, and the details thereof will be described later).

In step S2, the color-and-sensitivity mosaic image generated by image capturing is converted by demosaicing by the signal processing system, mainly including the image processor 7, into an image in which each pixel has all red (R), green (G), and blue (B) components and a uniform sensitivity. The description of the schematic operation of the digital still camera is completed.

FIGS. 3 to 16 show patterns of assorted color components and sensitivities of pixels of a color-and-sensitivity mosaic image (hereinafter referred to as color-and-sensitivity mosaic patterns) P1 to P14, respectively. A basic combination of colors in a color-and-sensitivity mosaic pattern consists of red (R), green (G), and blue (B). Alternatively, a color-and-sensitivity mosaic pattern may consist of other three primary colors or four primary colors, namely, yellow (Y), magenta (M), cyan (C), and green (G).

The basic sensitivity consists of two levels, namely, S0 and S1. Alternatively, sensitivity may consist of more levels.

Referring to FIGS. 3 to 16, each square corresponds to one pixel, where the alphabet symbol represents the color component and the subscript represents the sensitivity. For example, the pixel represented by $G_0$ has the green (G) color component and the S0 sensitivity. The larger the number, the higher the sensitivity.

Color-and-sensitivity mosaic patterns P1 to P14 are classified according to the following first to fourth characteristics.

The first characteristic is that pixels of the same color and sensitivity are arranged in a grid and that pixels of the same color, regardless of the sensitivity, are arranged in a grid. The first characteristic will now be described with reference to color-and-sensitivity mosaic pattern P1 shown in FIG. 3.

In color-and-sensitivity mosaic pattern P1, when rotated clockwise by 45 degrees, pixels having the red (R) color, regardless of the sensitivity, are arranged in a grid at an interval of $2^{1/2}$ in the horizontal direction and at an interval of $2^{3/2}$ in the vertical direction. Pixels having the blue (B) color, regardless of the sensitivity, are arranged in a similar grid. Pixels having the green (G) color, regardless of the sensitivity, are arranged in a grid at an interval of $2^{1/2}$ in both the horizontal and vertical directions.

In addition to color-and-sensitivity mosaic pattern P1 shown in FIG. 1, the first characteristic is exhibited by color-and-sensitivity mosaic patterns P2, P4, P6, P8, P9, P10, P11, and P13.

The second characteristic is that pixels of the same color and sensitivity are arranged in a grid; pixels of the same sensitivity, regardless of the color, are arranged in a grid; and an arbitrary pixel and its neighboring four pixels (above, below, left, and right of the arbitrary pixel) contain all the colors included in this color-and-sensitivity mosaic pattern.

In addition to color-and-sensitivity mosaic pattern P3 shown in FIG. 5, the second characteristic is exhibited by color-and-sensitivity mosaic patterns P5, P7, P8, P9, P12, and P14.

The third characteristic is that, in addition to the first characteristic, the three colors are arranged in a Bayer pattern. The third characteristic will be described with reference to color-and-sensitivity mosaic pattern P2 shown in FIG. 4. In color-and-sensitivity mosaic pattern P2, pixels having the green (G) color, regardless of the sensitivity, are arranged in a checkered pattern, skipping every other pixel. Pixels having the red (R) color, regardless of the sensitivity, are arranged in every other line. Similarly, pixels having the blue (B) color, regardless of the sensitivity, are arranged in every other line.

In terms of the colors of pixels, color-and-sensitivity mosaic pattern P2 has the Bayer pattern. In addition to color-and-sensitivity mosaic pattern P2, the third characteristic is exhibited by color-and-sensitivity mosaic patterns P10 and P11.

The fourth characteristic is that, in addition to the second characteristic, pixels of the same sensitivity are arranged in a Bayer pattern. The fourth characteristic will be described with reference to color-and-sensitivity mosaic pattern P3 shown in FIG. 5. In color-and-sensitivity mosaic pattern P3, when rotated 45 degrees, pixels having the S0 sensitivity have the Bayer pattern at an interval of $2^{1/2}$. Similarly, pixels having the sensitivity S1 have the Bayer pattern.

In addition to color-and-sensitivity mosaic pattern P3, the fourth characteristic is exhibited by color-and-sensitivity mosaic patterns P5 and P12.

Regarding the arrangement of colors and sensitivities of color-and-sensitivity mosaic patterns P1 to P14, "a color mosaic" refers to a pattern of colors, regardless of the sensitivities of pixels, and "a sensitivity mosaic" refers to a pattern of sensitivities, regardless of the colors of pixels.

A method of creating the above-described color-and-sensitivity mosaic pattern by the CCD image sensor 4 will now be described.

Of the color-and-sensitivity mosaic pattern, a color mosaic is created by disposing on-chip color filters that only allow light of different colors to pass through individual pixels on the top surfaces of photo sensors of the CCD image sensor 4.

Of the color-and-sensitivity mosaic pattern, a sensitivity mosaic is created by an optical method or an electronic method.

Figure 17:
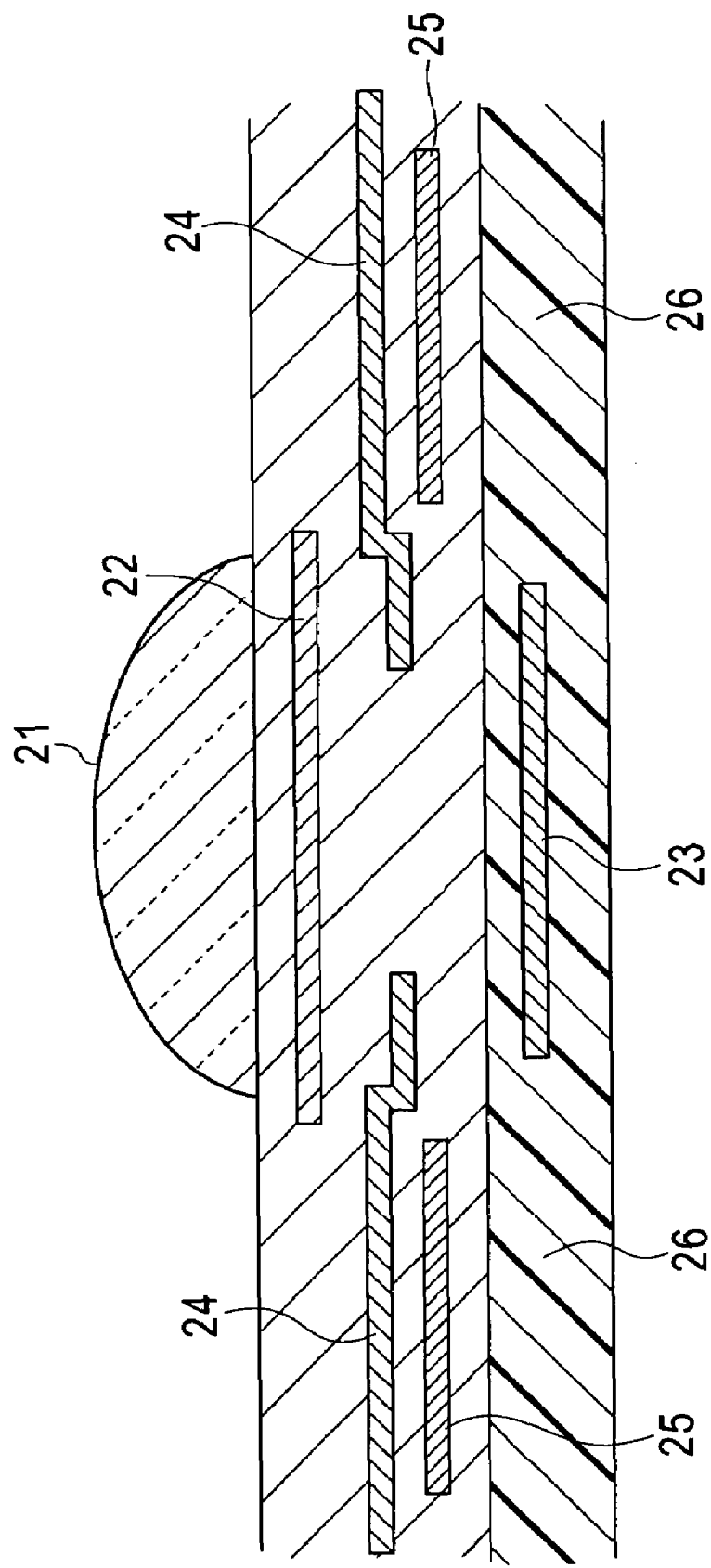
FIG. 17 is a sectional view of a built-in photo sensor in a CCD image sensor.

A method of optically creating a sensitivity mosaic will now be described. Prior to this, each photo sensor that is included in the CCD image sensor 4 and that generates a pixel signal for one pixel will now be described. FIG. 17 shows a cross section of the photo sensor included in the CCD image sensor 4. An on-chip lens 21 is disposed on the top surface of the photo sensor. The on-chip lens 21 converges incident light coming from above to a photo diode 23. An on-chip color filter 22 restricts the spectrum band of the incident light, that is, allows light only in a predetermined spectrum band to pass through. Below the photo sensor, the photo diode 23 is disposed in a wafer. On both sides of the photo diode 23, a vertical register 26 is disposed. Above the vertical register 26, a vertical register driving electrode 25 for driving the vertical register 26 is wired.

Since the vertical register 26 is an area for transferring charge generated in the photo diode 23, the vertical register 26 and the vertical register driving electrode 25 are protected from light by a shield 24 so that no charge is generated in this area. The shield 24 has an opening above the photo diode 23. The incident light passes through this opening and reaches the photo diode 23.

Using the CCD image sensor 4 arranged as described above, the sensitivity of each photo sensor can be changed. In other words, the amount of incident light reaching the photo diode 23 can be changed.

Figure 18:
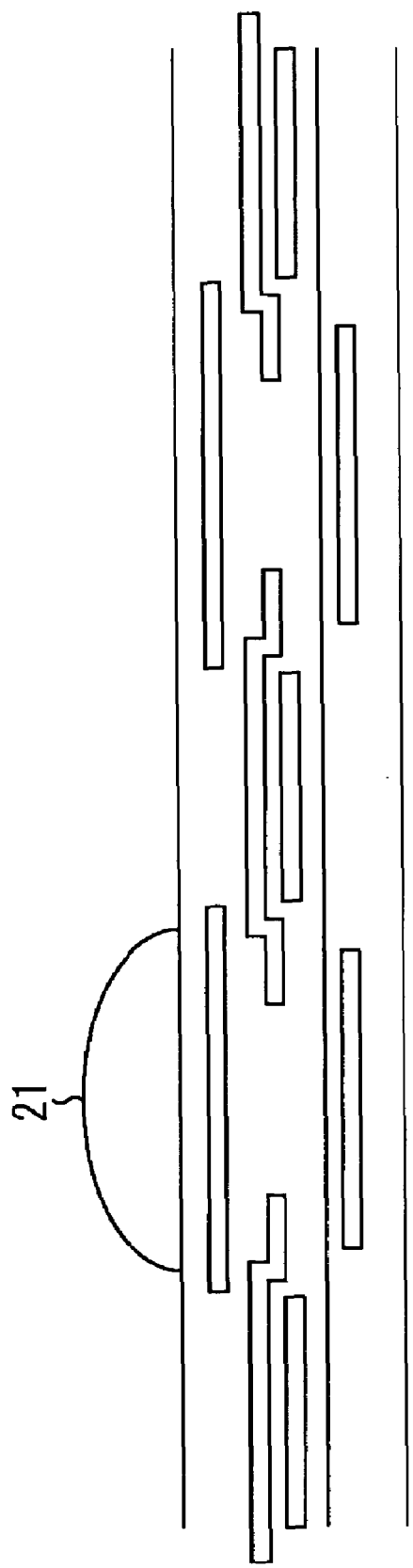
FIG. 18 illustrates a method of optically creating a sensitivity mosaic by presence/absence of an on-chip lens.
Figure 19:
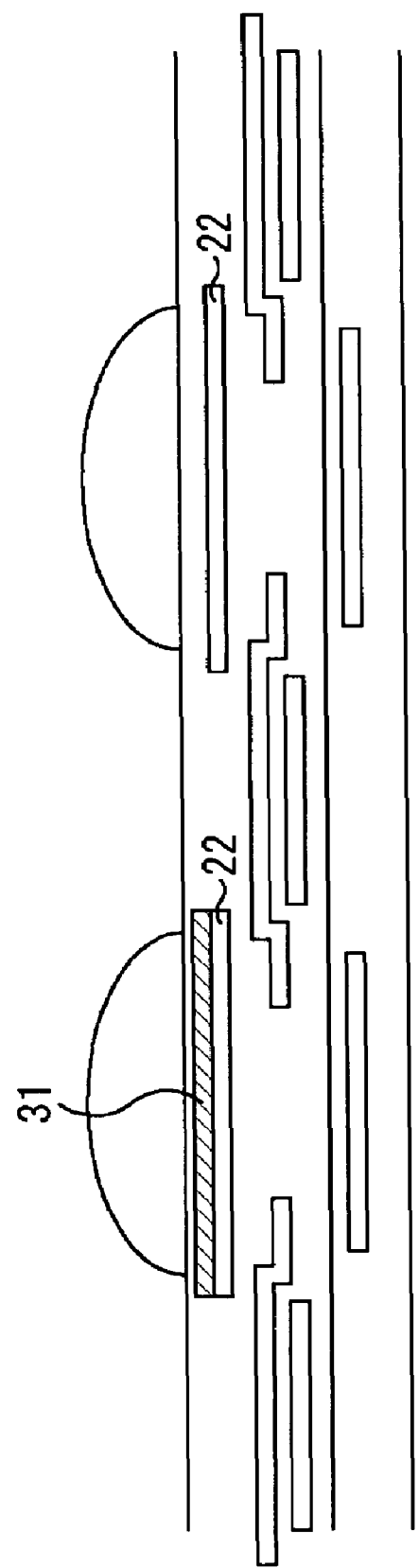
FIG. 19 illustrates a method of optically creating a sensitivity mosaic by presence/absence of an on-chip neutral density filter.
Figure 20:
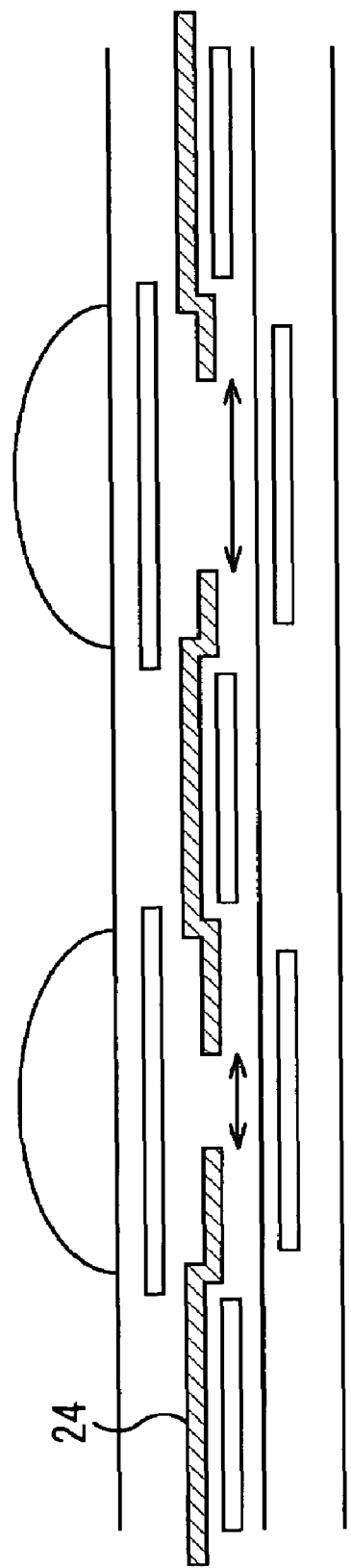
FIG. 20 describes a method of optically creating a sensitivity mosaic by the area of an opening.

To optically create a sensitivity mosaic, for example, there is a method of changing the amount of converged light by presence/absence of the on-chip lens 21, as in two photo sensors shown in FIG. 18. Referring to FIG. 19, another possible method is to change light transmittance by, for example, disposing a neutral density filter 31 above (or below) the on-chip color filter 22. Referring to FIG. 20, another possible method is to change the amount of incident light reaching the photo diode 23 by changing the area of the opening of the shield 24.

Figure 21:
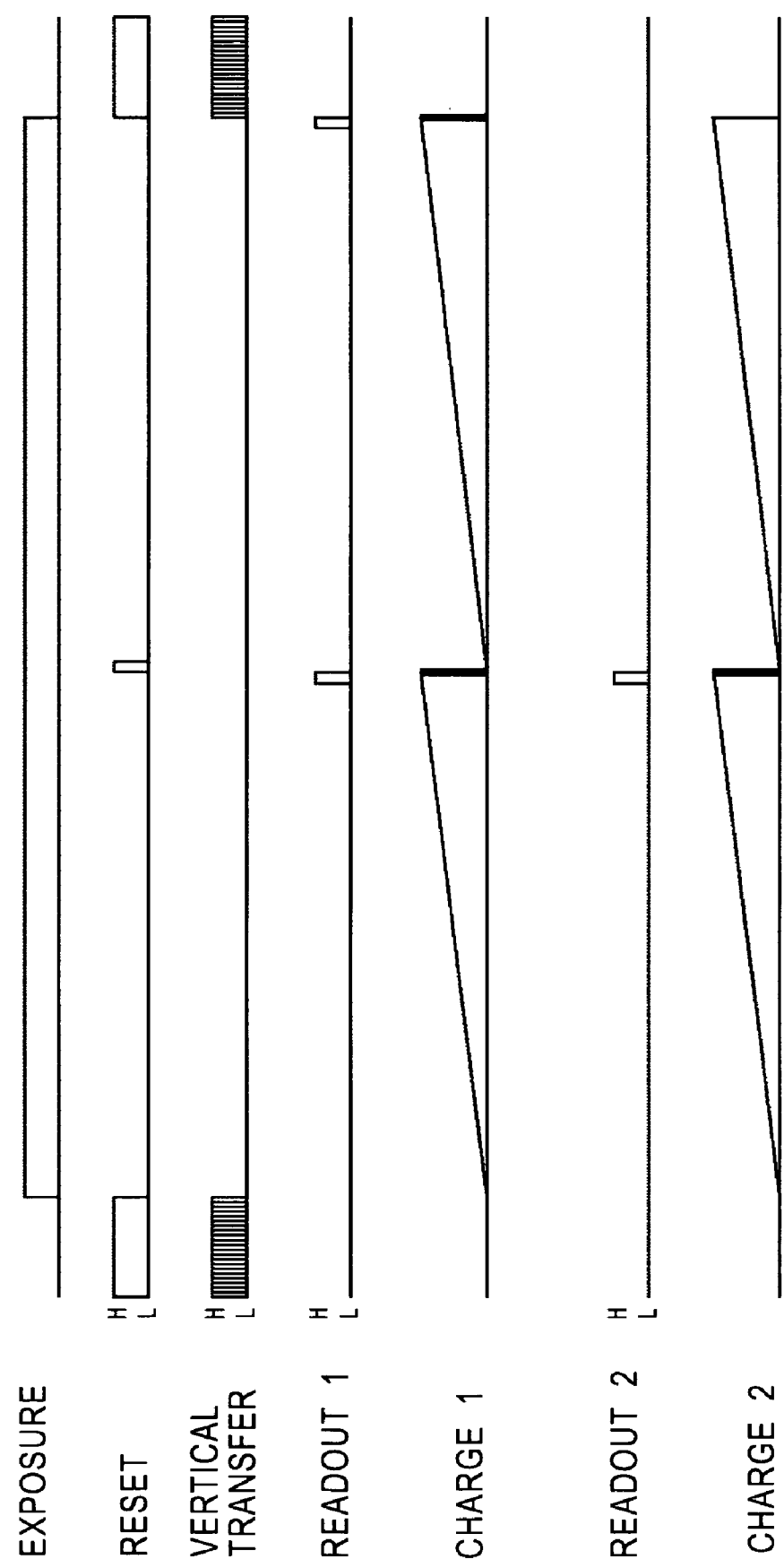
FIG. 21 is a timing chart describing a first method of electronically creating a sensitivity mosaic.

Two methods of electronically creating a sensitivity mosaic will now be described. Referring to FIG. 21, a first method of setting two adjacent photo sensors (referred to as first and second photo sensors) to different sensitivities by, for example, changing control timing of the two photo sensors will now be described.

Referring to FIG. 21, the first row from the top shows an exposure period of the CCD image sensor 4; the second row shows the timing of pulsed voltage instructing charge sweeping; the third row shows the application timing of control voltage instructing charge transfer; the fourth row shows the timing of pulsed voltage instructing the first photo sensor to read charge; the fifth row shows variations in charge accumulated in the first photo sensor in response to application of the charge-sweeping pulsed voltage and the charge-readout pulsed voltage; the sixth row shows the timing of pulsed voltage instructing the second photo sensor to read charge; and the seventh row shows variations in charge accumulated in the second photo sensor in response to application of the charge-sweeping pulsed voltage and the charge-reading pulsed voltage.

According to the first method of electronically creating a sensitivity mosaic, the charge-sweeping pulsed voltage is commonly applied to the first and second photo sensors so as to sweep (i.e., reset) charge from the photo diode 23 in a period other than the exposure period and to reset charge once at a predetermined time in the exposure period.

In the period other than the exposure period, the charge-transfer voltage is commonly applied to the first and second photo sensors so that the vertical register 26 transfers charge. In the exposure period, no charge-transfer voltage is applied so that the charge transfer from the vertical resistor 26 is stopped.

The charge-readout pulsed voltage is applied to the first and second photo sensors at different times. The charge-readout pulsed voltage is applied for the first time to the first photo sensor immediately before the charge-sweeping pulsed voltage is applied in the exposure period (the second row in FIG. 21), and the charge-readout pulsed voltage is applied for the second time to the first photo sensor immediately before the end of the exposure period.

As a result of such control, the charge accumulated in the first photo sensor is read out to the vertical register 26 twice at the times at which the charge-readout pulsed voltage is applied for the first and second times. Since the charge transfer from the vertical register 26 is stopped in the exposure period, the charges read out at these two times are added in the vertical register 26. The sum charge is transferred as data within the same frame from the vertical register 26 after the end of the exposure period.

The charge-readout pulsed voltage is applied to the second photo sensor only once immediately before the charge-sweeping pulsed voltage is applied in the exposure period. As a result, the charge accumulated in the second photo sensor at the time the charge-readout pulsed voltage is applied once is read out to the vertical register 26. Since the charge transfer from the vertical register 26 is stopped in the exposure period, the accumulated charge read from the second photo sensor is transferred from the vertical register 26 after the end of the exposure period. This charge serves as data within the same frame as that of the accumulated charge read from the first photo sensor.

By changing the control timing of the first photo sensor from the control timing of the second photo sensor, the accumulated charge, that is, the sensitivity, read from the first photo sensor is designed to differ from that read from the second photo sensor in the exposure period.

The first method of electronically creating a sensitivity mosaic is disadvantageous in that it cannot measure information on a subject throughout the exposure period, depending on the photo sensors.

Figure 22:
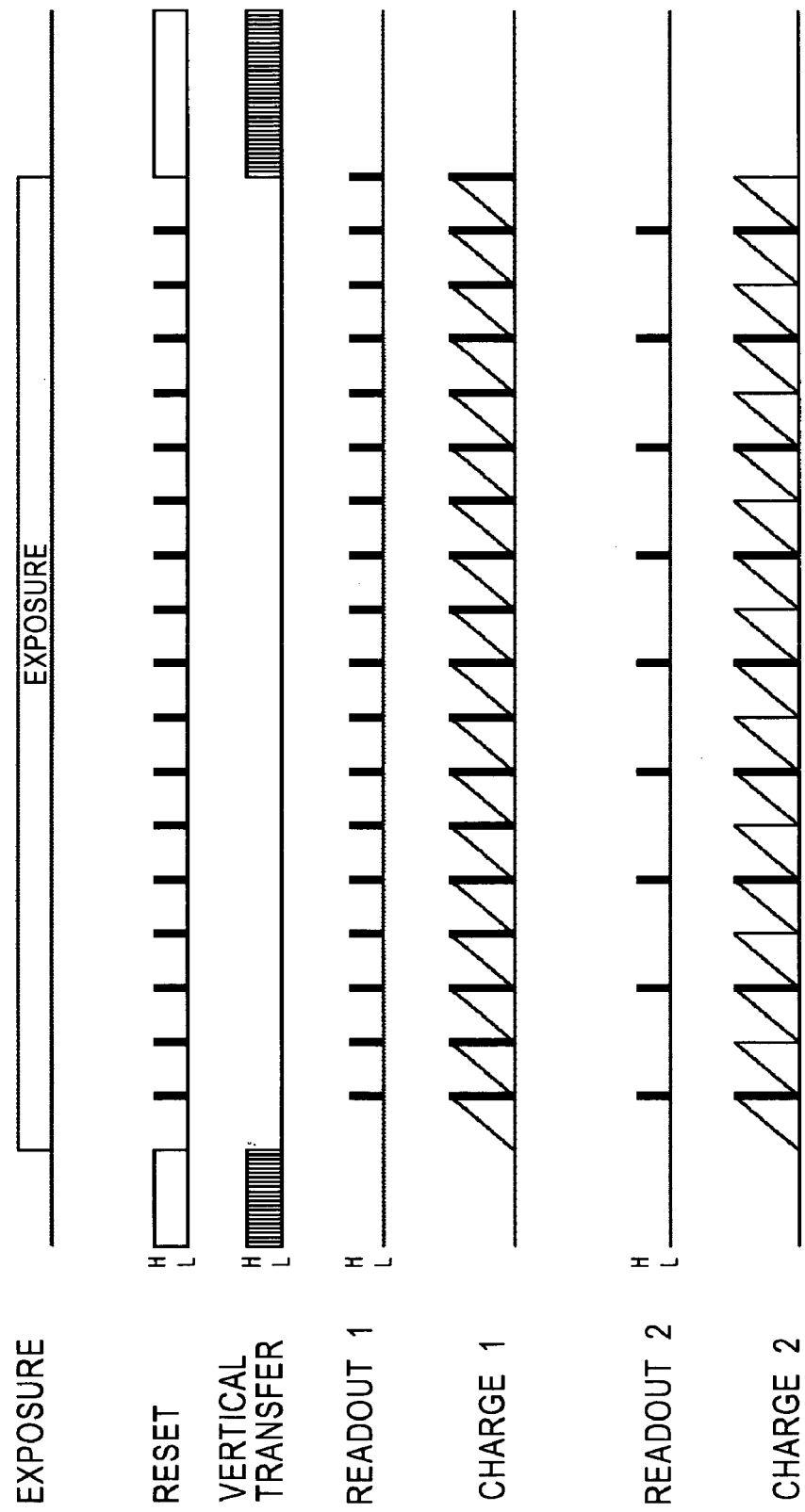
FIG. 22 is a timing chart describing a second method of electronically creating a sensitivity mosaic.

Referring to FIG. 22, a second method of electronically creating a sensitivity mosaic will now be described. The first to seventh rows in FIG. 22 correspond to those in FIG. 21. That is, the first to seventh rows show the exposure time of the CCD image sensor 4, the timing of pulsed voltage instructing charge sweeping, the application timing of control voltage instructing charge transfer, the timing of pulsed voltage instructing the first photo sensor to read charge, variations in charge accumulated in the first photo sensor in response to application of the charge-sweeping pulsed voltage and the charge-readout pulsed voltage, the timing of pulsed voltage instructing the second photo sensor to read charge, and variations in charge accumulated in the second photo sensor in response to application of the charge-sweeping pulsed voltage and the charge-readout pulsed voltage, respectively.

According to the second method of electronically creating a sensitivity mosaic, the charge-sweeping pulsed voltage and the charge-readout pulsed voltage are repeatedly applied multiple times in the exposure period.

Specifically, a set of the first-time charge-sweeping pulsed voltage and the second-time charge-sweeping pulsed voltage is applied multiple times commonly to the first and second photo sensors in the exposure period. In each set of the first-time and second-time charge-sweeping pulsed voltages, the charge-readout pulsed voltage is applied to the first photo sensor for the first time immediately before the first-time charge-sweeping pulsed voltage, and the charge-readout pulsed voltage is applied for the second time immediately before the second charge-sweeping pulsed voltage. In each set of the charge-sweeping pulsed voltages, the charge-readout pulsed voltage is applied to the second photo sensor only once immediately before the first-time charge-sweeping pulsed voltage.

As a result, in each set of the first-time and second-time charge-sweeping pulsed voltages, the charge accumulated in the first photo sensor at the time the charge-readout pulsed voltage is applied for the first time and the charge accumulated in the first photo sensor at the time the charge-readout voltage is applied for the second time are read from the first photo sensor. Since the charge transfer from the vertical register 26 is stopped in the exposure period, the charges read twice in every set are added in the vertical register 26. The charge accumulated in the second photo sensor at the time the charge-readout pulsed voltage is applied only once in every set of the first-time and second-time charge-sweeping pulsed voltages is read from the second photo sensor. These charges read once in every set are added in the vertical register 26.

According to the second method of electronically creating a sensitivity mosaic, charge reading is repeated multiple times in the exposure period. Information on a subject is thus measured throughout the exposure period.

In relation to the above-described first and second methods of electronically creating a sensitivity mosaic, read control of the CCD image sensor 4 operates on application of voltage to the vertical register driving electrode 25, which is included in every horizontal line. To create a sensitivity mosaic, such as that of color-and-sensitivity mosaic pattern P1 shown in FIG. 3, in which each horizontal line has a different sensitivity, the electrode structure of the CCD image sensor 4 is slightly modified so as to apply the readout pulsed voltage that differs in every line. In a progressive-scan CCD image sensor with three-phase-drive vertical registers, an arbitrary mosaic of two sensitivity levels is created electronically by modifying the electrode structure thereof.

Figure 23:
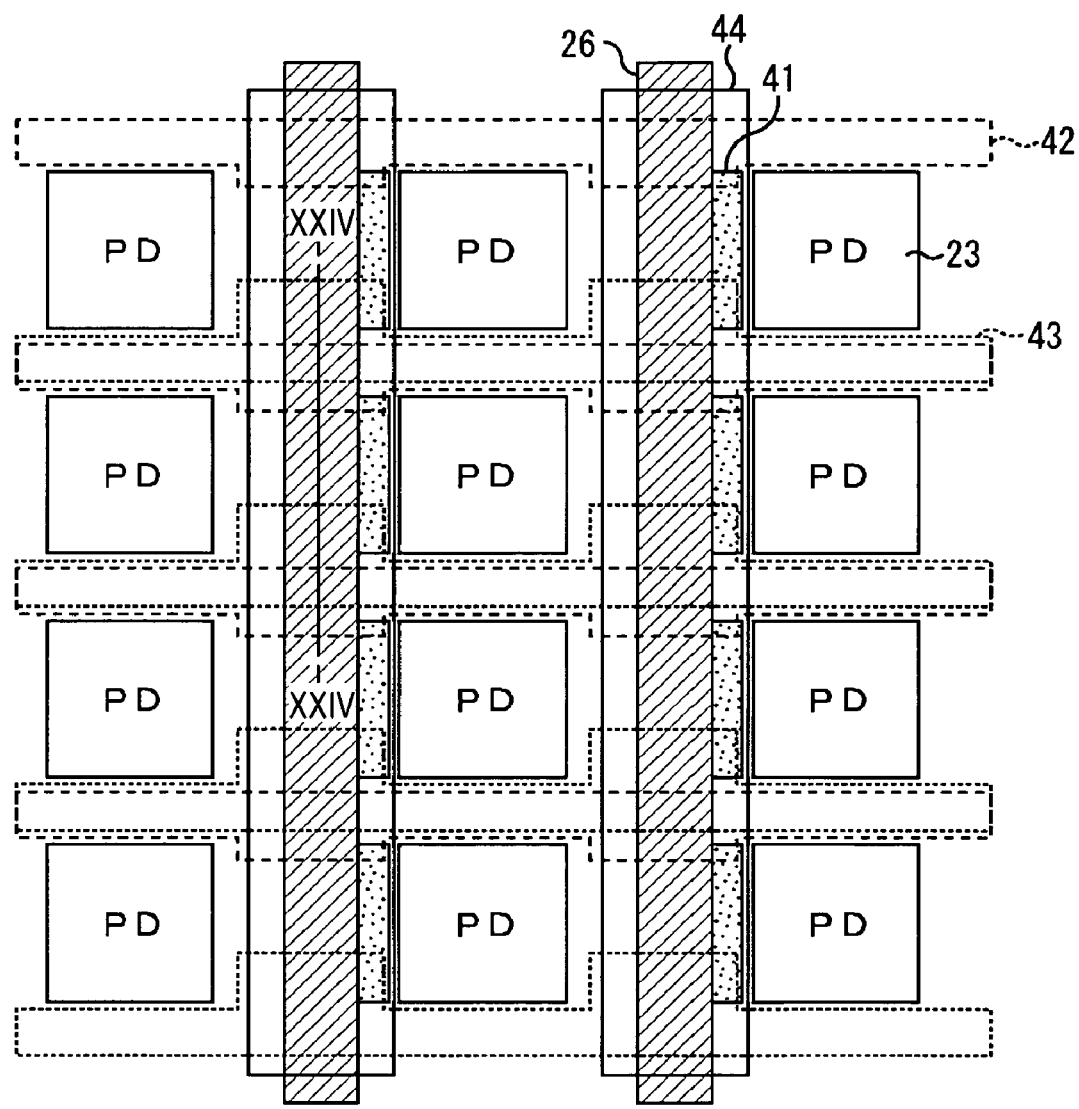
FIG. 23 is an illustration of an OR electrode structure.
Figure 24:
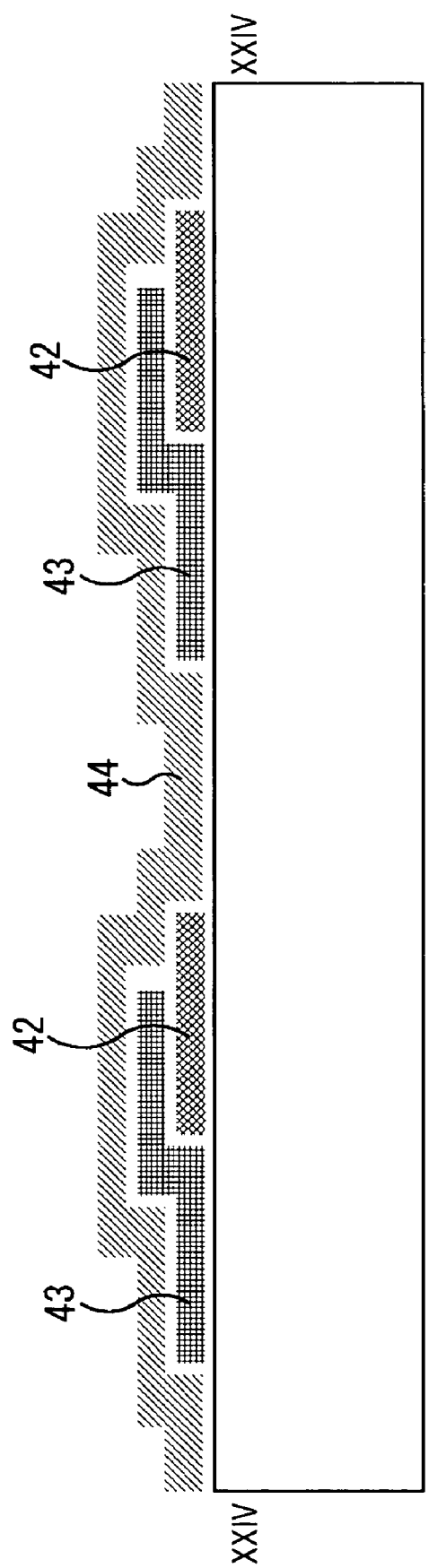
FIG. 24 is a sectional view of the OR electrode structure.

FIG. 23 shows a first electrode structure including vertical-transfer polysilicon electrode based on electrode wiring used to create a sensitivity mosaic of two sensitivity levels. FIG. 24 shows a sectional view of the CCD image sensor 4 taken along line XXIV-XXIV of FIG. 23. A fist-phase vertical register driving electrode 42 and a second-phase vertical register driving electrode 43 are connected to electrodes of adjacent pixels on the same horizontal line. Therefore, the electrodes on the same horizontal line are driven in synchronization. A third-phase vertical register driving electrode 44 is connected to electrodes of adjacent pixels on the same vertical line. The electrodes on the same vertical line are driven in synchronization. The second-phase and third-phase vertical register driving electrodes 43 and 44 overlap readout gates 41 adjacent to the corresponding photo diodes 23.

In response to application of the readout pulse to the second-phase or third-phase vertical register driving electrode 43 or 44, barriers of the readout gates 41 are temporarily removed, and charges accumulated in the corresponding photo diodes 23 are transferred to the vertical registers 26. The electrode structure shown in FIGS. 23 and 24 is referred to as an OR electrode structure.

Figure 25:
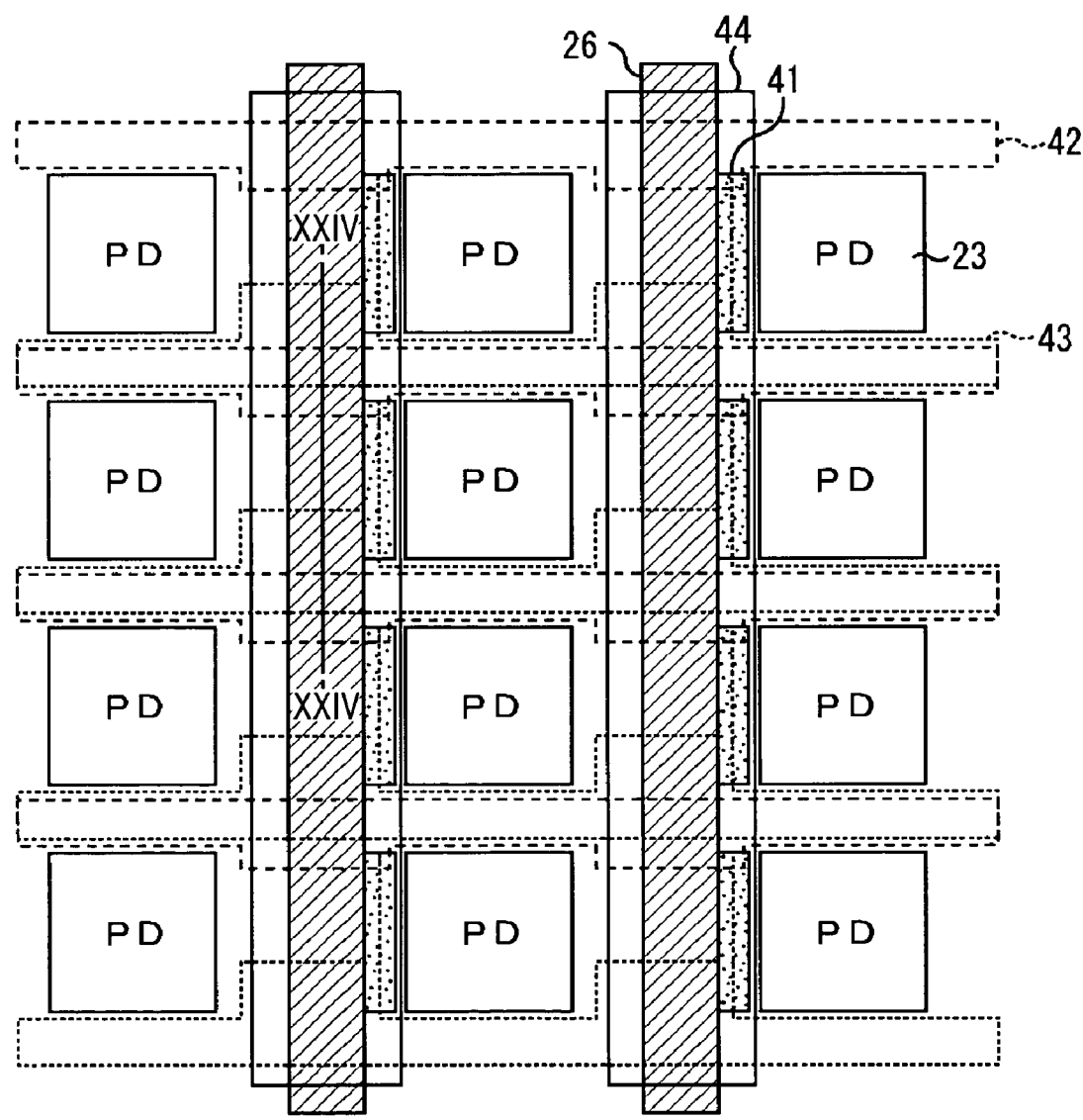
FIG. 25 is an illustration of an AND electrode structure.

FIG. 25 shows a second electrode structure including vertical-transfer polysilicon electrode based on electrode wiring used to create a sensitivity mosaic of two sensitivity levels. A cross section of the CCD image sensor 4 taken along line XXIV-XXIV of FIG. 25 is similar to that shown in FIG. 24. In other words, according to the second electrode structure, as in the first electrode structure, the first-phase and second-phase vertical register driving electrodes 42 and 43 are connected to electrodes of adjacent pixels on the same horizontal line. Therefore, the electrodes on the same horizontal line are driven in synchronization. As in the first electrode structure, the third-phase vertical register driving electrode 44 is connected to electrodes of adjacent pixels on the same vertical line. Therefore, the electrodes on the same vertical line are driven in synchronization.

The second electrode structure differs from the first electrode structure in that the second-phase vertical register driving electrode 43 has a thin portion that is disposed along the marginal border of the photo diode 23 associated with the third-phase vertical register driving electrode 44 and that overlaps the readout gate 41 adjacent to the photo diode 23.

In response to application of the readout pulsed voltage to one of the second-phase and third-phase vertical register driving electrodes 43 and 44, the barriers of the readout gates 41 cannot be removed. To remove the barriers of the readout gates 41 and transfer charge accumulated in the photo diodes 23 to the vertical registers 26, the readout pulsed voltage must be applied simultaneously to the second-phase and third-phase vertical register driving electrodes 43 and 44. The electrode structure shown in FIG. 25 is referred to as an AND electrode structure.

By using the above-described OR and AND electrode structures within one CCD image sensor, an arbitrary mosaic of two sensitivity levels is created. For example, assorted OR and AND electrode structures shown in FIG. 26 are employed to create a sensitivity mosaic pattern of color-and-sensitivity mosaic pattern P1.

As is clear from a comparison of color-and-sensitivity mosaic pattern P3 shown in FIG. 5 and a pattern shown in FIG. 28, the AND electrode structure is used for each pixel with the S0 sensitivity, and the OR electrode structure is used for each pixel with the S1 sensitivity. In the CCD image sensor 4 including the assorted OR and AND electrode structures, application of the readout pulsed voltage to the second-phase vertical register driving electrode 43 causes only the OR pixels to read charge. In contrast, simultaneous application of the readout pulsed voltage to the second-phase and third-phase vertical register driving electrodes 43 and 44 causes both the OR and AND pixels, that is, all pixels, to read charge.

Application of the pulsed voltage to the second-phase and third-phase vertical register driving electrodes 43 and 44 is such that, with reference to the control timing shown in FIG. 21 (or FIG. 22), both the second-phase and third-phase vertical register driving electrodes 43 and 44 are driven at the time the charge-readout pulsed voltage is applied for the first time (fourth row) and at the time the charge-readout pulsed voltage is applied (sixth row), whereas only the second-phase vertical register driving electrode 43 is driven at the time the charge-readout pulsed voltage is applied for the second time (fourth row). As a result, the OR pixels have the high sensitivity S1, whereas the AND pixels have the low sensitivity S0.

Another sensitivity mosaic of two sensitivity levels may be created by a similar method. For example, assorted OR and AND electrode structures shown in FIG. 27 are employed to create a sensitivity mosaic pattern of color-and-sensitivity mosaic pattern P2 (FIG. 4).

Assorted OR and AND electrode structures shown in FIG. 28 are employed to create a sensitivity mosaic pattern of color-and-sensitivity mosaic pattern P3 (FIG. 5). Assorted OR and AND electrode structures shown in FIG. 29 are employed to create a sensitivity mosaic pattern of color-and-sensitivity mosaic pattern P4 (FIG. 6). Assorted OR and AND electrode structures shown in FIG. 30 are employed to create a sensitivity mosaic pattern of color-and-sensitivity mosaic pattern P5 (FIG. 7).

The description of the mechanism for creating a color-and-sensitivity mosaic image is completed.

Figure 31:
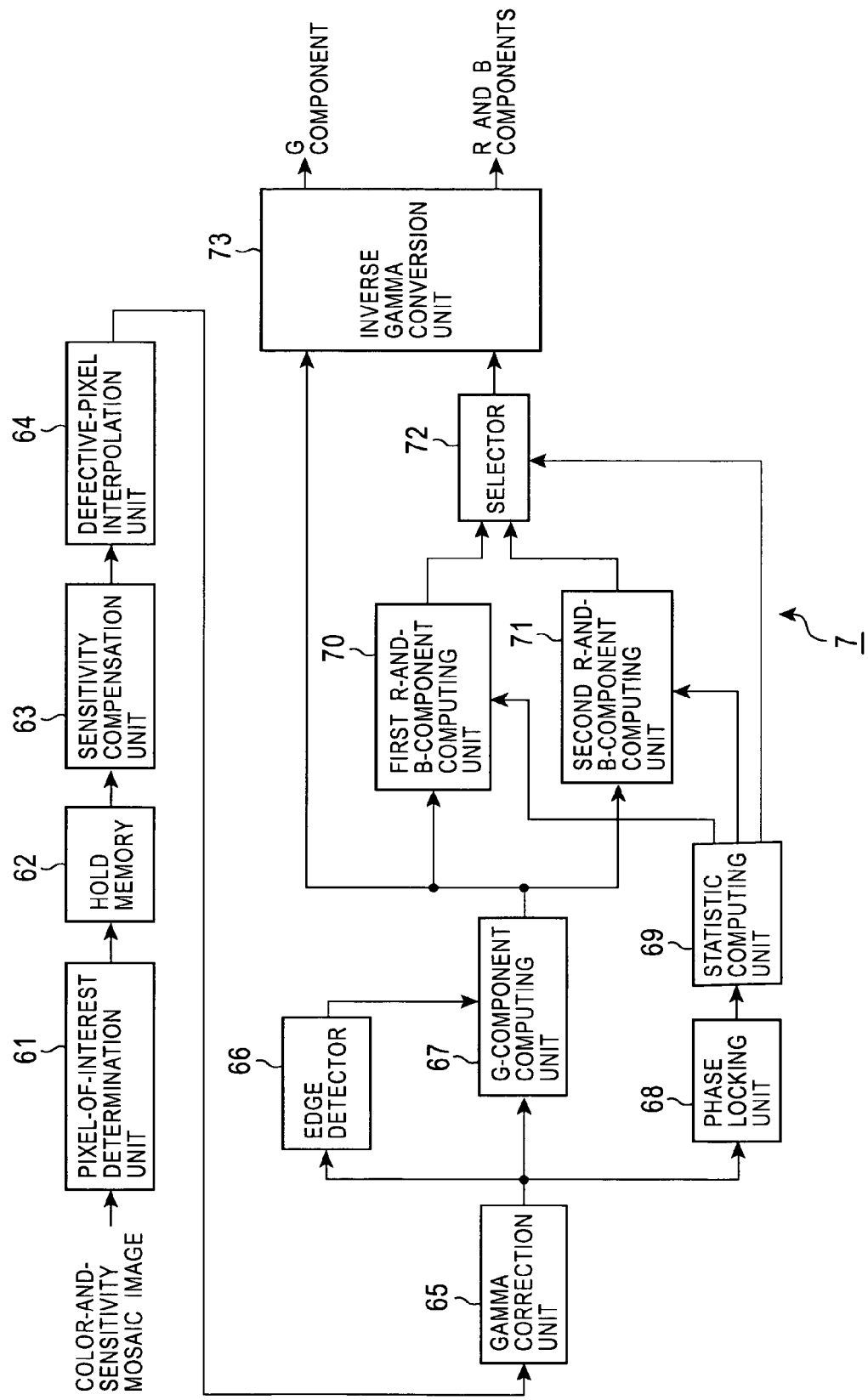
FIG. 31 is a block diagram of a first example of the structure of an image processor shown in FIG. 1.

FIG. 31 shows a first example of the structure of the image processor 7 shown in FIG. 1. A pixel-of-interest determination unit 61 of the image processor 7 sequentially (one at a time) determines, of pixels of a color-and-sensitivity mosaic image received from the previous stage, one pixel as a pixel of interest, extracts a local area (e.g., 7 by 7 pixels) centered on the pixel of interest, and stores the local area in a hold memory 62. The hold memory 62 stores the local area, which is received from the pixel-of-interest determination unit 61 and which is centered on the pixel of interest of the color-and-sensitivity mosaic image. Of pixels included in the local area centered on the pixel of interest of the color-and-sensitivity mosaic image, a sensitivity compensation unit 63 compensates a color component signal of a low-sensitivity pixel for sensitivity so that the color component signal corresponds to that captured with high sensitivity and outputs the resulting local color mosaic image as local area information to a defective-pixel interpolation unit 64.

Figure 32:
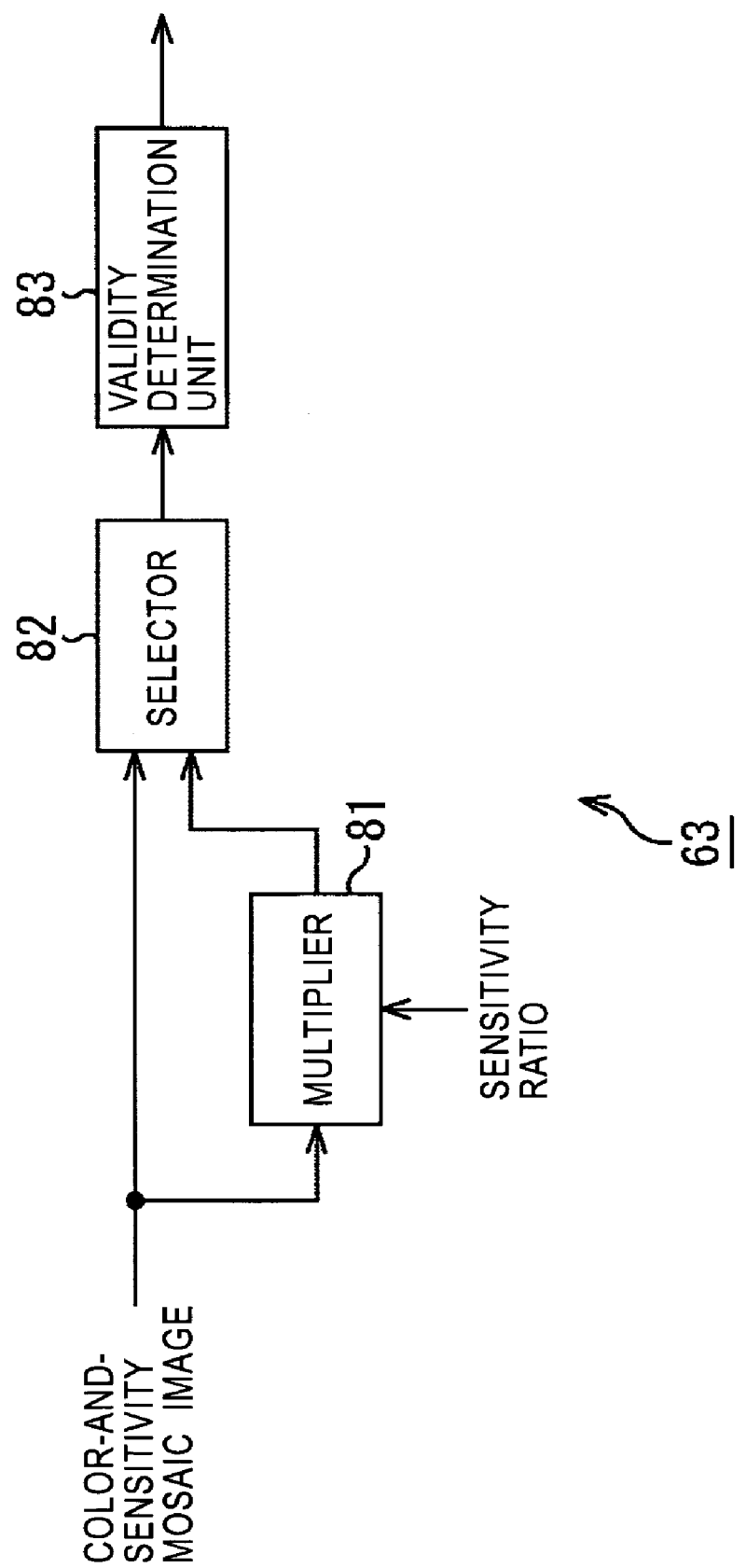
FIG. 32 is a block diagram of an example of the structure of a sensitivity compensation unit shown in FIG. 31.

FIG. 32 shows an example of the structure of the sensitivity compensation unit 63. A multiplier 81 of the sensitivity compensation unit 63 multiplies each pixel of the local color-and-sensitivity mosaic image held in the hold memory 62 by the sensitivity ratio of high to low image capturing sensitivities and outputs the product to a selector 82. The selector 82 receives the local color-and-sensitivity mosaic image and a sensitivity-compensated color-and-sensitivity mosaic image output from the multiplier 81 and, on the basis of information indicating the sensitivity pattern of the color-and-sensitivity mosaic image stored in advance, outputs a pixel of the local color-and-sensitivity mosaic pattern at a high-sensitivity pixel position to a validity determination unit 83 and a pixel of the sensitivity-compensated color-and-sensitivity mosaic image at a low-sensitivity pixel position to the validity determination unit 83.

Of pixels of the local color mosaic image received from the selector 82, in which the pixels have a uniform high sensitivity, the validity determination unit 83 determines a pixel whose pixel value (color component value) is less than or equal to a predetermined noise level or greater than or equal to a predetermined saturation level as an invalid pixel and replaces the pixel value of the invalid pixel with a value indicating that the pixel is invalid (e.g., a negative value). The validity determination unit 83 outputs the local area information in which invalid pixels are replaced whereas valid pixels remain unchanged to the defective-pixel interpolation unit 64 at a subsequent stage.

Referring back to FIG. 31, when the pixel of interest at the center of the local area information received from the sensitivity compensation unit 63 is a defective pixel, which is a pixel determined as an invalid pixel by the validity determination unit 83 of the sensitivity compensation unit 63, the defective-pixel interpolation unit 64 interpolates the defective pixel using other pixels included in the local area information and outputs the local area information in which the defective pixel is interpolated to a gamma conversion or gamma correction unit 65.

Figure 33:
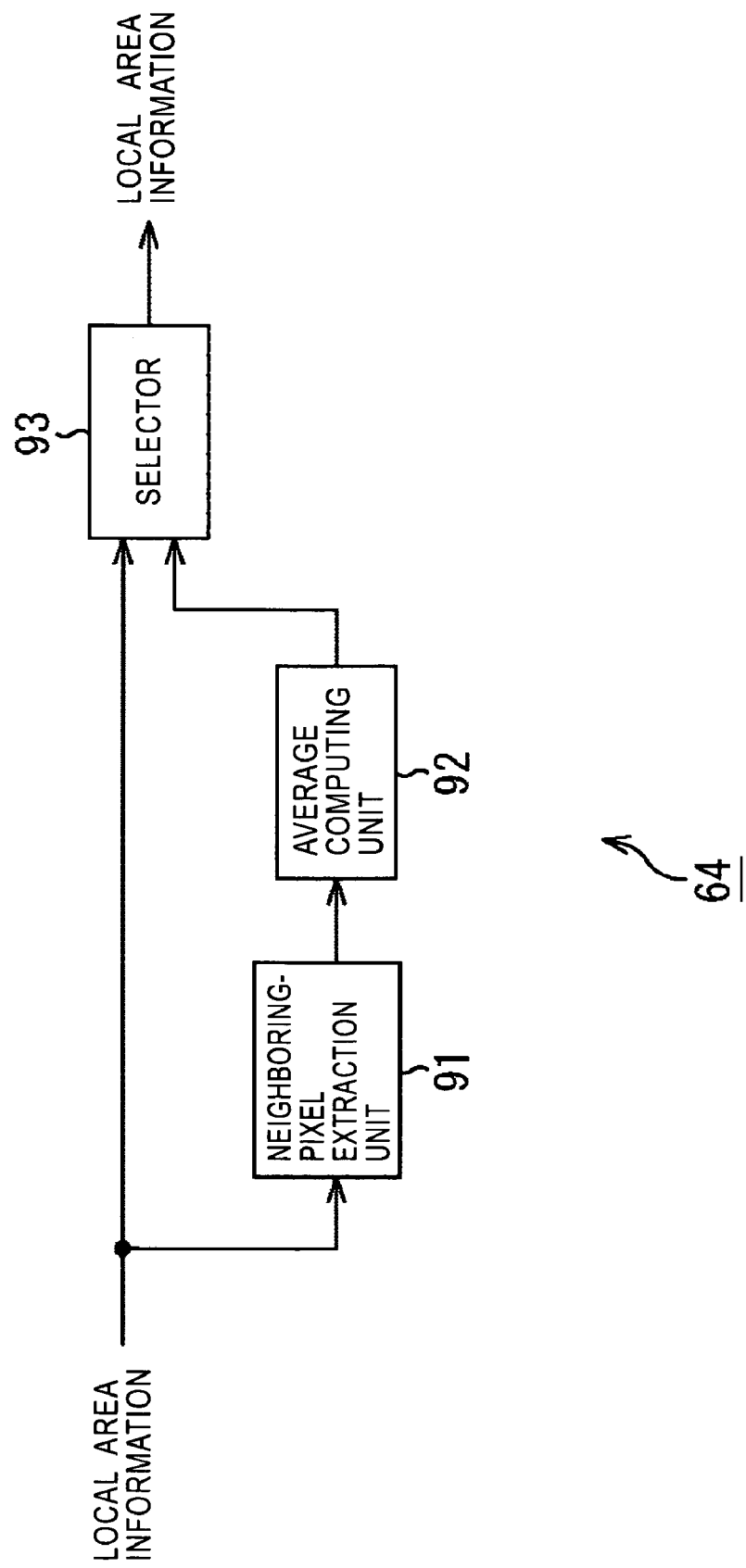
FIG. 33 is a block diagram of a first example of the structure of a defective-pixel interpolation unit shown in FIG. 31.

FIG. 33 shows a first example of the structure of the defective-pixel interpolation unit 64. A neighboring-pixel extraction unit 91 of the first example extracts, of the pixels included in the local area information, pixels having the same color component as that of the pixel of interest and outputs the extracted pixels to an average computing unit 92.

Figures 34A, 34B, 34C:
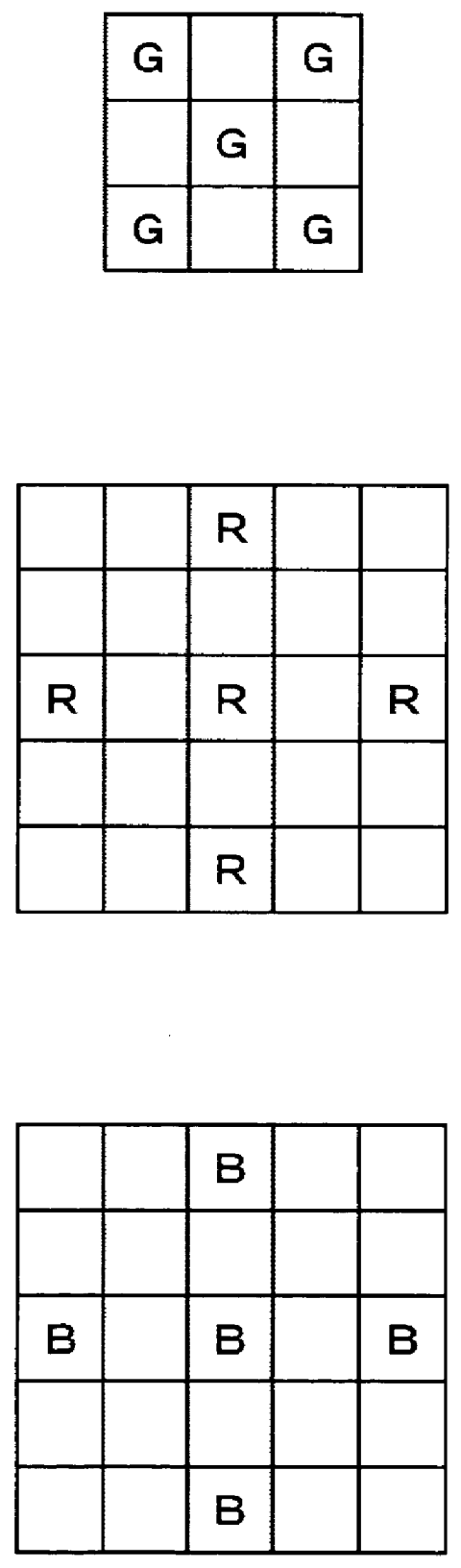

For example, when the color mosaic pattern of the color mosaic image held in the hold memory 62 has a Bayer pattern, and when the pixel of interest has the green (G) component, as shown in FIG. 34A, the neighboring-pixel extraction unit 91 extracts pixels that are diagonally adjacent to the pixel of interest at the center and that have the green (G) component. When the pixel of interest has the red (R) component, as shown in FIG. 34B, the neighboring-pixel extraction unit 91 extracts pixels that are adjacent (above, below, left, and right) to the pixel of interest at the center with a pixel therebetween and that have the red (R) component. Similarly, when the pixel of interest has the blue (B) component, as shown in FIG. 34C, the neighboring-pixel extraction unit 91 extracts pixels that are adjacent (above, below, left, and right) to the pixel of interest at the center with a pixel therebetween and that have the blue (B) component.

The average computing unit 92 computes the average of pixel values (color component values) of the plural pixels received from the neighboring-pixel extraction unit 91 and outputs the average to a selector 93. When the pixel value of the pixel of interest at the center of the local area information is a value indicating that the pixel of interest is an invalid pixel (e.g., a negative value), the selector 93 replaces the pixel value of the pixel of interest of the local area information with the output of the average computing unit 92 (average of the neighboring pixels) and outputs the resulting local area information to the gamma correction unit 65 at a subsequent stage. When the pixel value of the pixel of interest is not a value indicating that the pixel of interest is an invalid pixel, the selector 93 outputs the local area information, which is received from the previous stage, unchanged to the gamma correction unit 65 at the subsequent stage.

Figure 35:
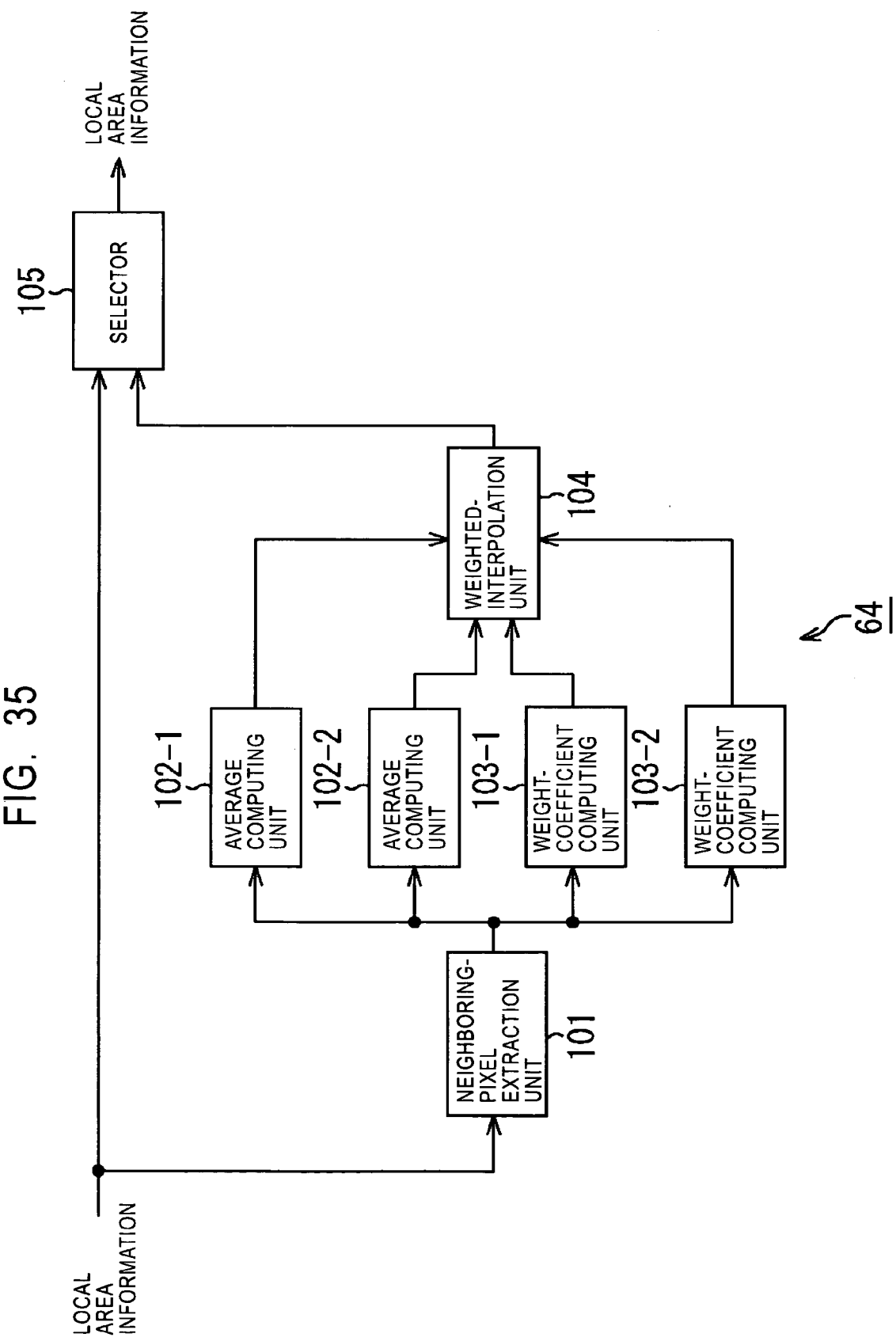
FIG. 35 is a block diagram of a second example of the structure of the defective-pixel interpolation unit shown in FIG. 31.

FIG. 35 shows a second example of the structure of the defective-pixel interpolation unit 64. A neighboring-pixel extraction unit 101 of the second example extracts, of the pixels included in the local area information, pixels having the same color component as that of the pixel of interest and outputs the extracted pixels to average computing units 102-1 and 102-2 and to weight-coefficient computing units 103-1 and 103-2.

Of the pixels received from the neighboring-pixel extraction unit 101, the average computing unit 102-1 computes the average of pixels positioned above and below (in the vertical direction) the pixel of interest and outputs the average to a weighted-interpolation unit 104. Of the pixels received from the neighboring-pixel extraction unit 101, the average computing unit 102-2 computes the average of pixels positioned on the right and left sides (in the horizontal direction) of the pixel of interest and outputs the average to the weighted-interpolation unit 104.

The weight-coefficient computing unit 103-1 computes a vertical weight coefficient for use in computing, by the weighted-interpolation unit 104, the weighted average of the output of the average computing unit 102-1 and the output of the average computing unit 102-2 and outputs the vertical weight coefficient to the weighted-interpolation unit 104. The weight-coefficient computing unit 103-2 computes a horizontal weight coefficient for use in computing, by the weighted-interpolation unit 104, the weighted average of the output of the average computing unit 102-1 and the output of the average computing unit 102-2 and outputs the horizontal weight coefficient to the weighted-interpolation unit 104.

The weighted-interpolation unit 104 computes the weighted average of the output of the average computing unit 102-1 and the output of the average computing unit 102-2 using the vertical weight coefficient received from the weight-coefficient computing unit 103-1 and the horizontal weight coefficient received from the weight-coefficient computing unit 103-2 and outputs the computation result as an interpolated value of the pixel of interest to a selector 105. The weighted average of the pixels neighboring the pixel of interest may be computed in two directions (vertical and horizontal directions) or in other directions including an additional direction (e.g., diagonal direction).

When the pixel value of the pixel of interest at the center of the local area information is a value indicating that the pixel of interest is an invalid pixel (e.g., a negative value), the selector 105 replaces the pixel value of the pixel of interest of the local area information with the output of the weighted-interpolation unit 104 (weighted average of the neighboring pixels) and outputs the resulting local area information to the gamma correction unit 65 at the subsequent stage. When the pixel value of the pixel of interest is not a value indicating that the pixel of interest is an invalid pixel, the selector 105 outputs the local area information, which is received from the previous stage, unchanged to the gamma correction unit 65 at the subsequent stage.

Referring back to FIG. 31, the gamma correction unit 65 performs gamma conversion or gamma correction on the pixels included in the local area information received from the defective-pixel interpolation unit 64 and outputs the gamma-corrected local area information to an edge detector 66, a G-component computing unit 67, and a phase locking unit 68. Since the gamma correction unit 65 performs gamma correction on the local area information, it becomes easier from this point on to detect an edge and to make the colors even.

The edge-direction detector 66 detects an edge (contour of the subject or the like) of the local area information received from the gamma correction unit 65 and outputs detection results including an edge direction vector and the size of the edge direction vector (edge size) to the G-component computing unit 67.

Figure 36:
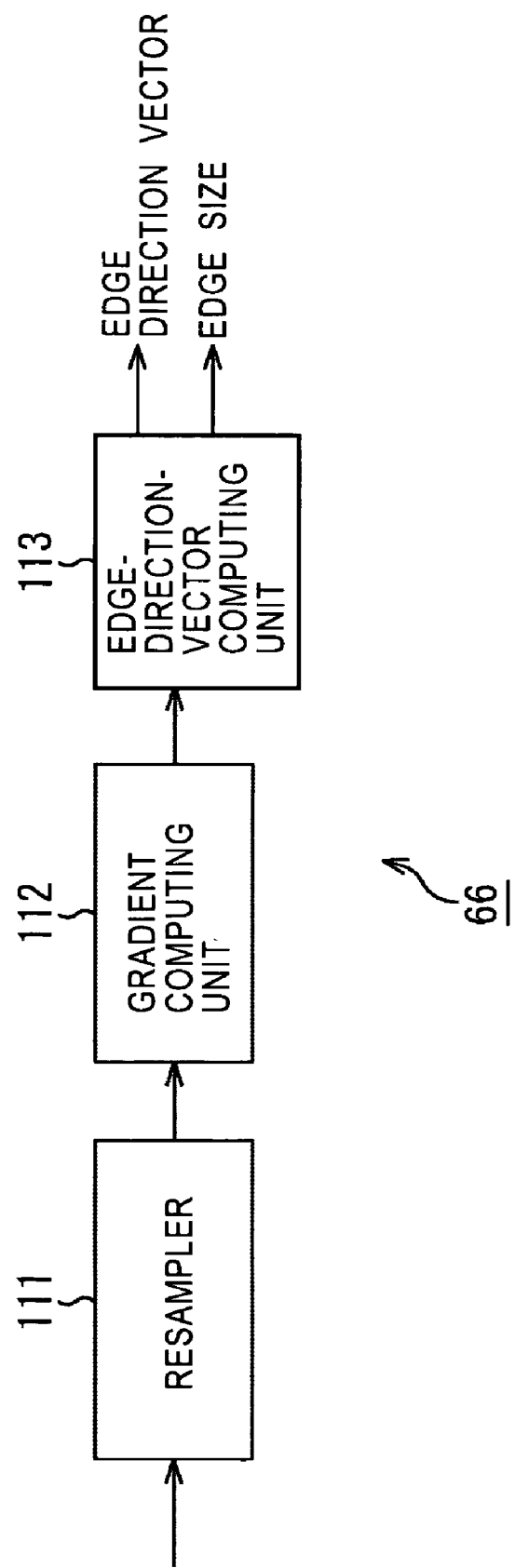
FIG. 36 is a block diagram of an example of the structure of an edge detector shown in FIG. 31.
Figure 37:
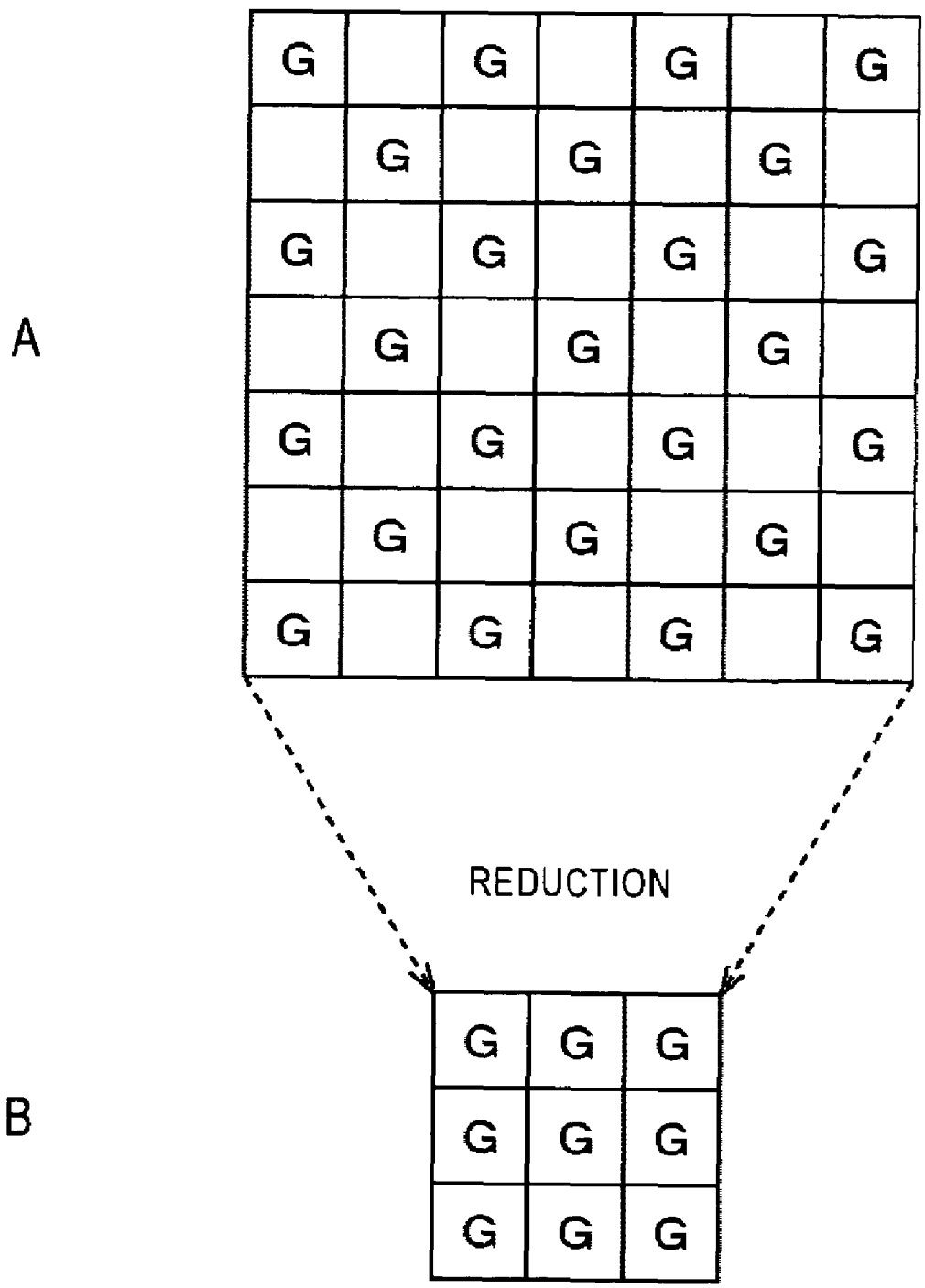
FIG. 37 illustrates the operation of a resampler shown in FIG. 36.

FIG. 36 shows an example of the structure of the edge-direction detector 66. Referring to FIG. 37A, a resampler 111 uses a low pass filter (LPF) or the like and generates, on the basis of only pixels having the green (G) component of pixels included in the gamma-corrected local area information, a reduced image consisting of 3 by 3 pixels, all of which have the green (G) component, shown in FIG. 37B, and outputs the reduced image to a gradient computing unit 112. Only the pixels having the green (G) component are employed since, of the red (R), green (G), and blue (B) components, statistically the green (G) component has most numerous pieces of brightness information. When the color mosaic pattern is a Bayer pattern, a portion occupied by pixels having the green (G) component is the largest.

Figures 38A, 38B:
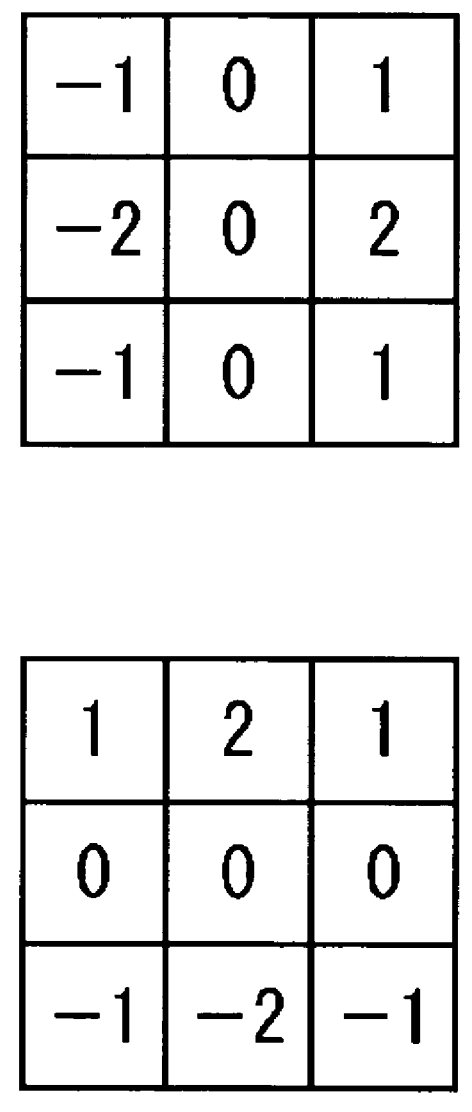
Figure 39:
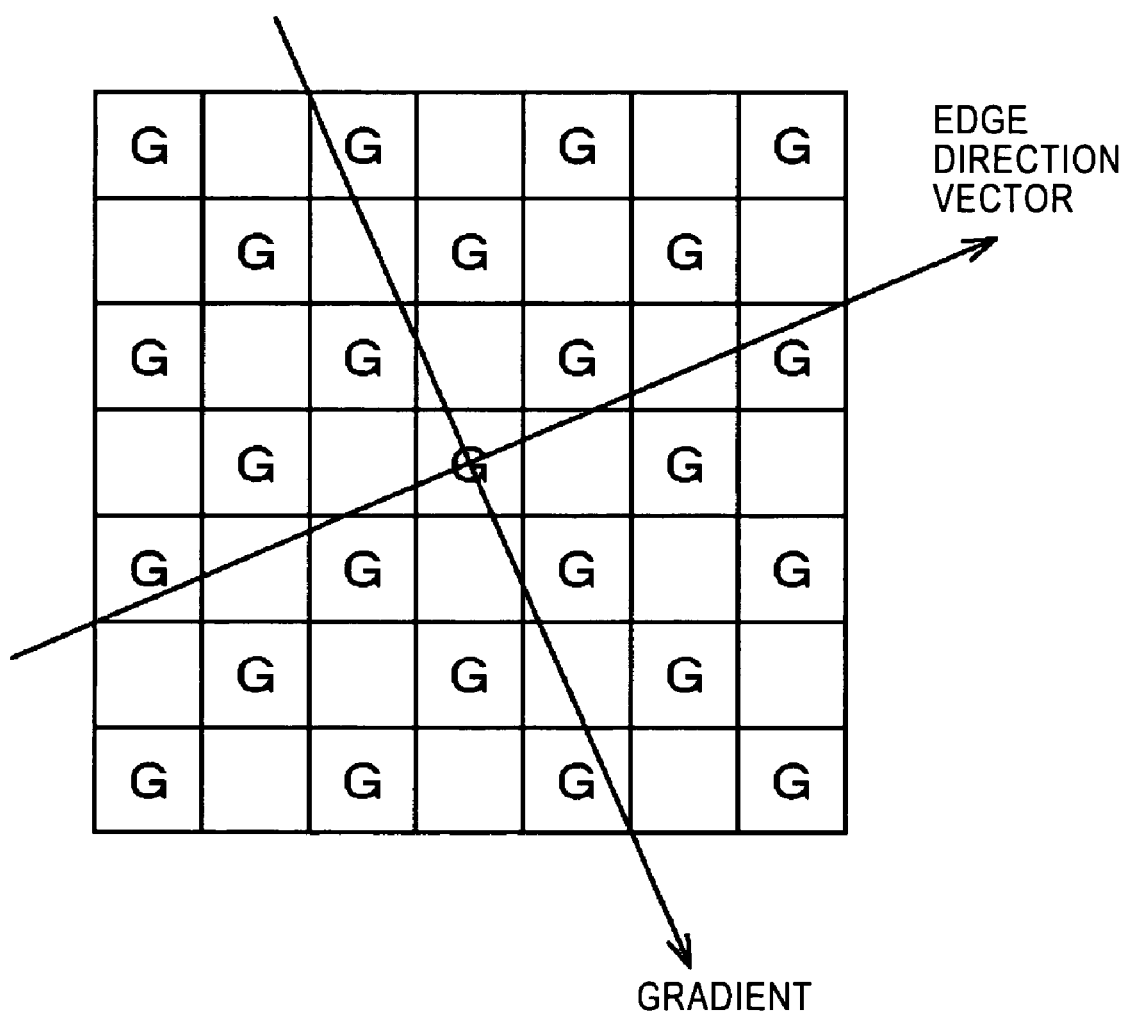
FIG. 39 is a diagram showing the relationship between a gradient and an edge direction vector.

The gradient computing unit 112 applies gradient operators (SOBEL filters) shown in FIGS. 38A and 38B to the reduced image received from the resampler 111 to compute the gradient of the green (G) components of the local area information, as shown in FIG. 39, and outputs the gradient to an edge-direction-vector computing unit 113. In addition to computing the gradient of the green (G) components of the local area information using the gradient operators (SOBEL filters), the gradient may be computed using dispersion and difference of the green (G) components of the local area information.

Referring to FIG. 39, the edge-direction-vector computing unit 113 computes an edge direction vector by rotating the gradient received from the gradient computing unit 112 by 90 degrees, computes the norm of the generated edge direction vector, and outputs the norm to the G-component computing unit 67.

Referring back to FIG. 31, the G-component computing unit 67 interpolates the green (G) component associated with the pixel of interest at the center of the local area information received from the gamma correction unit 65 using neighboring pixels having the green (G) component and outputs the interpolated green (g) component to a first R-and-B-component computing unit 70, a second R-and-B-component computing unit 71, and an inverse gamma conversion unit 73. When the pixel of interest at the center of the local area information received from the gamma correction unit 65 has the green (G) component, the local area information may be output unchanged to the subsequent stage.

Figure 40:
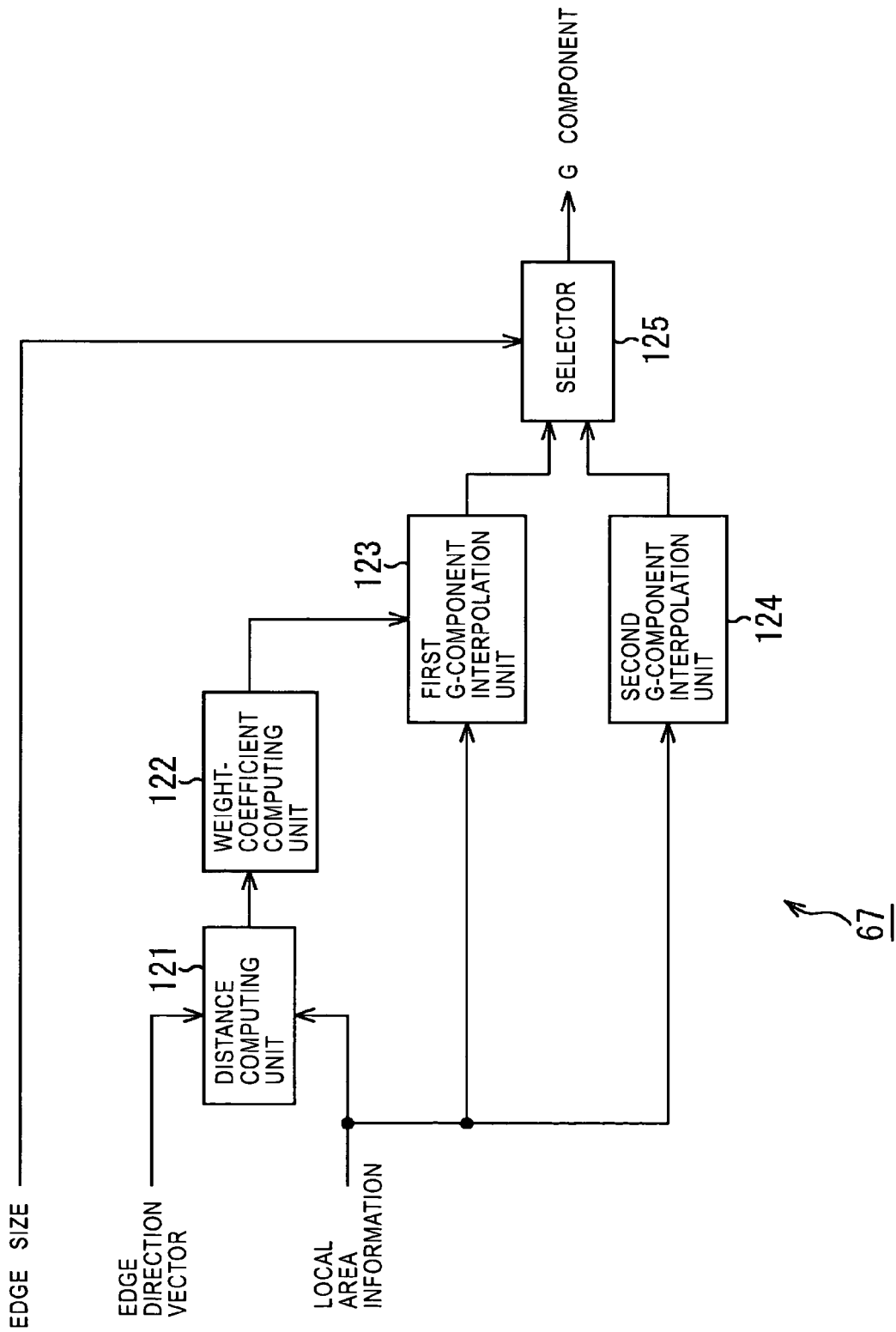
FIG. 40 is a block diagram of an example of the structure of a G-component computing unit shown in FIG. 31.
Figure 41:
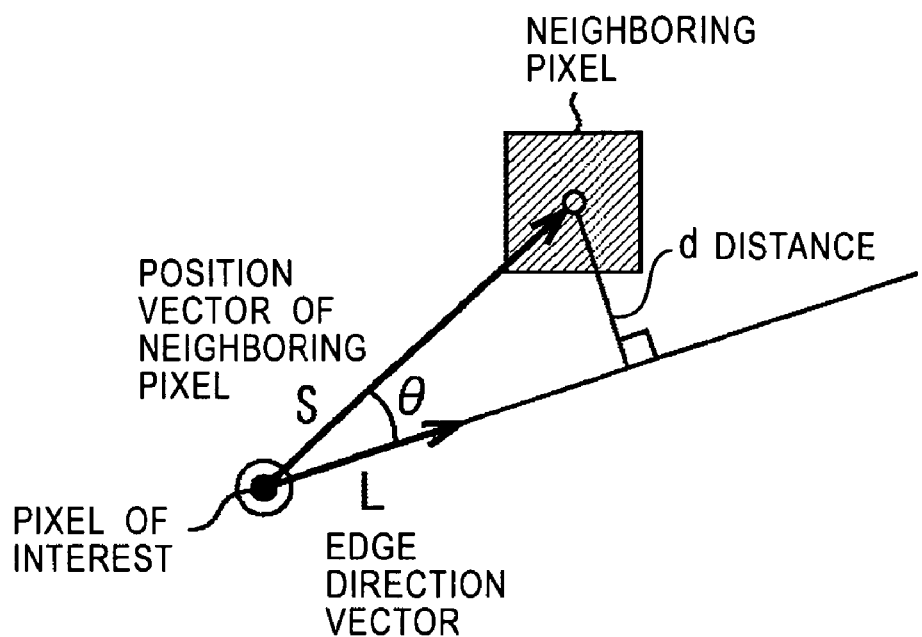
FIG. 41 illustrates the operation of a distance computing unit shown in FIG. 40.

FIG. 40 shows an example of the structure of the G-component computing unit 67. Referring to FIG. 41, a distance computing unit 121 of the G-component computing unit 67 computes the distance between each pixel that is included in the local area information and that has the green (G) component and a straight line that is parallel to the edge direction vector and that passes through the pixel of interest and outputs the computed distance to a weight-coefficient computing unit 122. The weight-coefficient computing unit 122 computes the weight coefficient of each pixel having the green (G) component such that, the shorter the distance between each pixel and the straight line, the larger the weight coefficient, and outputs the computed weight coefficient to a first G-component interpolation unit 123.

The first G-component interpolation unit 123 computes the weighted average of the pixels, which are included in the local area information received from the gamma correction unit 65 and which have the green (G) component, using the weight coefficients received from the weight-coefficient computing unit 122 and outputs the computation result to a selector 125. A second G-component interpolation unit 124 computes the average of the pixels, which are included in the local area information received from the gamma correction unit 65 and which have the green (G) component, and outputs the computation result to the selector 125.

When the edge size received from the edge-direction detector 66 exceeds a predetermined threshold, the selector 125 outputs the average weighted in the edge direction, which is received from the first G-component interpolation unit 123, as the green (G) component of the pixel of interest to a subsequent stage. When the edge size received from the edge-direction detector 66 does not exceed the predetermined threshold, the selector 125 outputs the value received from the second G-component interpolation unit 124 as the green (G) component of the pixel of interest to the subsequent stage.

Referring back to FIG. 31, the phase locking unit 68 interpolates the green (G) component associated with each pixel that is included in the local area information received from the gamma correction unit 65 and that has the blue (B) component or the red (R) component using pixels that are adjacent (above, below, left, and right) to this pixel and that have the green (G) component, adds the interpolated green (G) component to the local area information, and outputs the resulting local area information to a statistic computing unit 69.

Figure 42:
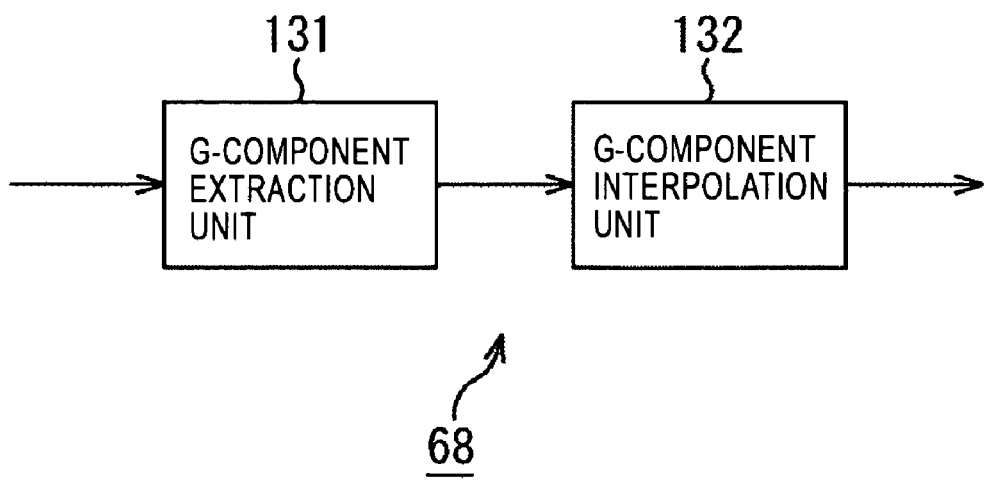
FIG. 42 is a block diagram of an example of the structure of a phase locking unit shown in FIG. 31.
Figures 43A, 43B:
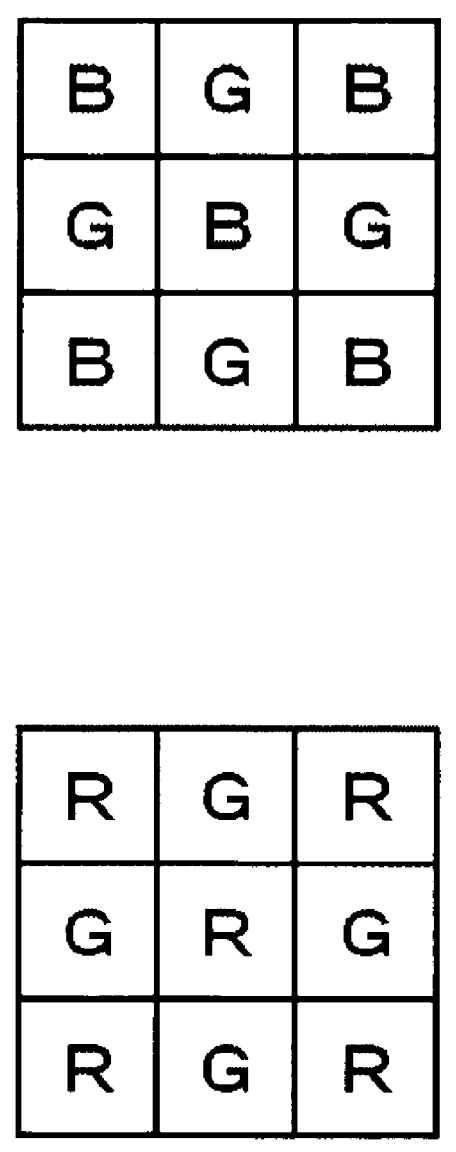

FIG. 42 shows an example of the structure of the phase locking unit 68. A G-component extraction unit 131 of the phase locking unit 68 extracts pixels that are included in the local area information received from the gamma correction unit 65 and that have the green (G) component and outputs the extracted pixels to a G-component interpolation unit 132. Referring to FIG. 43A, the G-component interpolation unit 132 interpolates the green (G) component associated with each pixel that is included in the local area information and that has the blue (B) component using pixels that are adjacent (above, below, left, and right) to this pixel and that have the green (G) component. Referring to FIG. 43B, the G-component interpolation unit 132 interpolates the green (G) component associated with each pixel that is included in the local area information and that has the red (R) component using pixels that are adjacent (above, below, left, and right) to this pixel and that have the green (G) component. Interpolation by the G-component interpolation unit 132 may be done by simply computing the average or by computing the weighted average taking into consideration the arrangement of pixels having the green (G) component.

Referring back to FIG. 31, on the basis of the local area information received from the phase locking unit 68, the statistic computing unit 69 computes the standard deviation of the red (R) components stddev R, the average of the red (R) components avg R, the standard deviation of the green (G) components stddev G, the average of the green (G) components avg G, the standard deviation of the blue (B) components stddev B, the average of the blue (B) components avg B, the correlation coefficient between the red (R) and green (G) components correlation(R, G), and the correlation coefficient between the blue (B) and green (G) components correlation(B, G) of the local area and outputs these computation results to the first R-and-B-component computing unit 70. The statistic computing unit 69 outputs the average of the red (R) components avg R, the average of the green (G) components avg G, and the average of the blue (B) components avg B to the second R-and-B-component computing unit 71. The statistic computing unit 69 outputs the standard deviation of the green (G) components stddev G to a selector 72. In the present specification, these values computed by the statistic computing unit 69 are referred to as static information.

FIG. 44 shows an example of the structure of the statistic computing unit 69. An R-component extraction unit 141-R of the statistic computing unit 69 extracts, of pixels included in the local area information received from the phase locking unit 68, pixels having the red (R) component and outputs the extracted pixels to an average computing unit 142-R and a standard-deviation computing unit 143-R. The average computing unit 142-R computes the average of the red (R) components avg R of the pixels received from the R-component extraction unit 141-R. The standard-deviation computing unit 143-R computes the standard deviation of the red (R) components stddev R on the basis of the pixels received from the R-component extraction unit 141-R and the average of the red (R) components avg R computed by the average computing unit 142-R.

A G-component extraction unit 141-G extracts, of the pixels included in the local area information received from the phase locking unit 68, pixels for which the green (G) components are generated by the phase locking unit 68 and outputs the extracted pixels to an average computing unit 142-G and a standard-deviation computing unit 143-G. The average computing unit 142-G computes the average of the green (G) components avg G of the pixels received from the G-component extraction unit 141-G. The standard-deviation computing unit 143-G computes the standard deviation of the green (G) components stddev G on the basis of the pixels received from the G-component extraction unit 141-G and the average of the green (G) components avg G computed by the average computing unit 142-G.

A B-component extraction unit 141-B extracts, of the pixels included in the local area information received from the phase locking unit 68, pixels having the blue (B) component and outputs the extracted pixels to an average computing unit 142-B and a standard-deviation computing unit 143-B. The average computing unit 142-B computes the average of the blue (B) components avg B of the pixels received from the B-component extraction unit 141-B. The standard-deviation computing unit 143-B computes the standard deviation of the blue (B) components stddev B on the basis of the pixels received from the B-component extraction unit 141-B and the average of the blue (B) components avg B computed by the average computing unit 142-B.

A correlation-coefficient computing unit 144 computes the correlation coefficient between the red (R) and green (G) components correlation(R, G) on the basis of the average of the red (R) components avg R, the standard deviation of the red (R) components stddev R, the average of the green (G) components avg G, and the standard deviation of the green (G) components stddev G:

correlation(R, G)=cover(R, G)/stddev R·stddev G cover(R, G)=[$\Sigma$($R_i$·$G_i$·$w_i$)/$\Sigma w_i$]–avg R·avg G where $R_i$ is the red (R) component of a pixel, $G_i$ is the green (G) component interpolated for the pixel having the red (R) component by the phase locking unit 68, $w_i$ is 1, and $\Sigma$ is the sum total.

A correlation-coefficient computing unit 145 computes the correlation coefficient between the blue (B) and green (G) components correlation(B, G) on the basis of the average of the blue (B) components avg B, the standard deviation of the blue (B) components stddev B, the average of the green (G) components avg G, and the standard deviation of the green (G) components stddev G:

correlation(B, G)=cover(B, G)/stddev B·stddev G cover(B, G)=[$\Sigma$($B_i$·$G_i$·$w_i$)/$\Sigma w_i$]–avg B·avg G where $B_i$ is the blue (B) component of a pixel, $G_i$ is the green (G) component interpolated for the pixel having the blue (B) component by the phase locking unit 68, $w_i$ is 1, and $\Sigma$ is the sum total.

Referring back to FIG. 31, the first R-and-B-component computing unit 70 applies the green (G) component of the pixel of interest, which is received from the G-component computing unit 67, and the standard deviation of the red (R) components stddev R, the average of the red (R) components avg R, the standard deviation of the green (G) components stddev G, the average of the green (G) components avg G, and the correlation coefficient between the red (R) and green (G) components correlation(R, G), which are received from the statistic computing unit 69, to the following equation to compute the red (R) component of the pixel of interest and outputs the computed red (R) component to the selector 72:

R component of pixel of interest=sign·(G–avg R)× (stddev R/stddev G)+avg R where sign is the sign of the correlation coefficient correlation(R, G).

The first R-and-B-component computing unit 70 applies the green (G) component of the pixel of interest, which is received from the G-component computing unit 67, and the standard deviation of the blue (B) components stddev B, the average of the blue (B) components avg B, the standard deviation of the green (G) components stddev G, the average of the green (G) components avg G, and the correlation coefficient between the blue (B) and green (G) components correlation(B, G), which are received from the statistic computing unit 69, to the following equation to compute the blue (B) component of the pixel of interest and outputs the computed blue (B) component to the selector 72:

B component of pixel of interest=sign·(G–avg B)× (stddev B/stddev G)+avg B where sign is the sign of the correlation coefficient correlation(B, G).

The second R-and-B-component computing unit 71 applies the green (G) component of the pixel of interest, which is received from the G-component computing unit 67, and the average of the red (R) components avg R and the average of the green (G) components avg G, which are received from the statistic computing unit 69, to the following equation to compute the red (R) component of the pixel of interest and outputs the computed red (R) component of the pixel of interest to the selector 72:

R component of pixel of interest=G×(avg R/avg G).

The second R-and-B-component computing unit 71 applies the green (G) component of the pixel of interest, which is received from the G-component computing unit 67, and the average of the blue (B) components avg B and the average of the green (G) components, which are received from the statistic computing unit 69, to the following equation to compute the blue (B) component of the pixel of interest and outputs the computed blue (B) component of the pixel of interest to the selector 72:

B component of pixel of interest=G×(avg B/avg G).

The selector 72 compares the standard deviation of the green (G) components stddev G of the local area, which is received from the statistic computing unit 69, with a predetermined threshold. When it is determined that the standard deviation of the green (G) components stddev G falls below the predetermined threshold, the outputs of the second R-and-B-component computing unit 71 are output as the red (R) and blue (B) components of the pixel of interest to the inverse gamma conversion unit 73. In contrast, when it is determined that the standard deviation of the green (G) components stddev G does not fall below the predetermined threshold, the outputs of the first R-and-B-component computing unit 70 are output as the red (R) and blue (B) components of the pixel of interest to the inverse gamma conversion unit 73.

The inverse gamma conversion unit 73 performs inverse gamma conversion or inverse gamma correction on the green (G) component of the pixel of interest, which is received from the G-component computing unit 67, and the red (R) and blue (B) components of the pixel of interest, which are received from the selector 72, and outputs the result as the red (R), green (G), and blue (B) components of a wide dynamic range color image associated with the pixel of interest to a subsequent stage.

Figure 45:
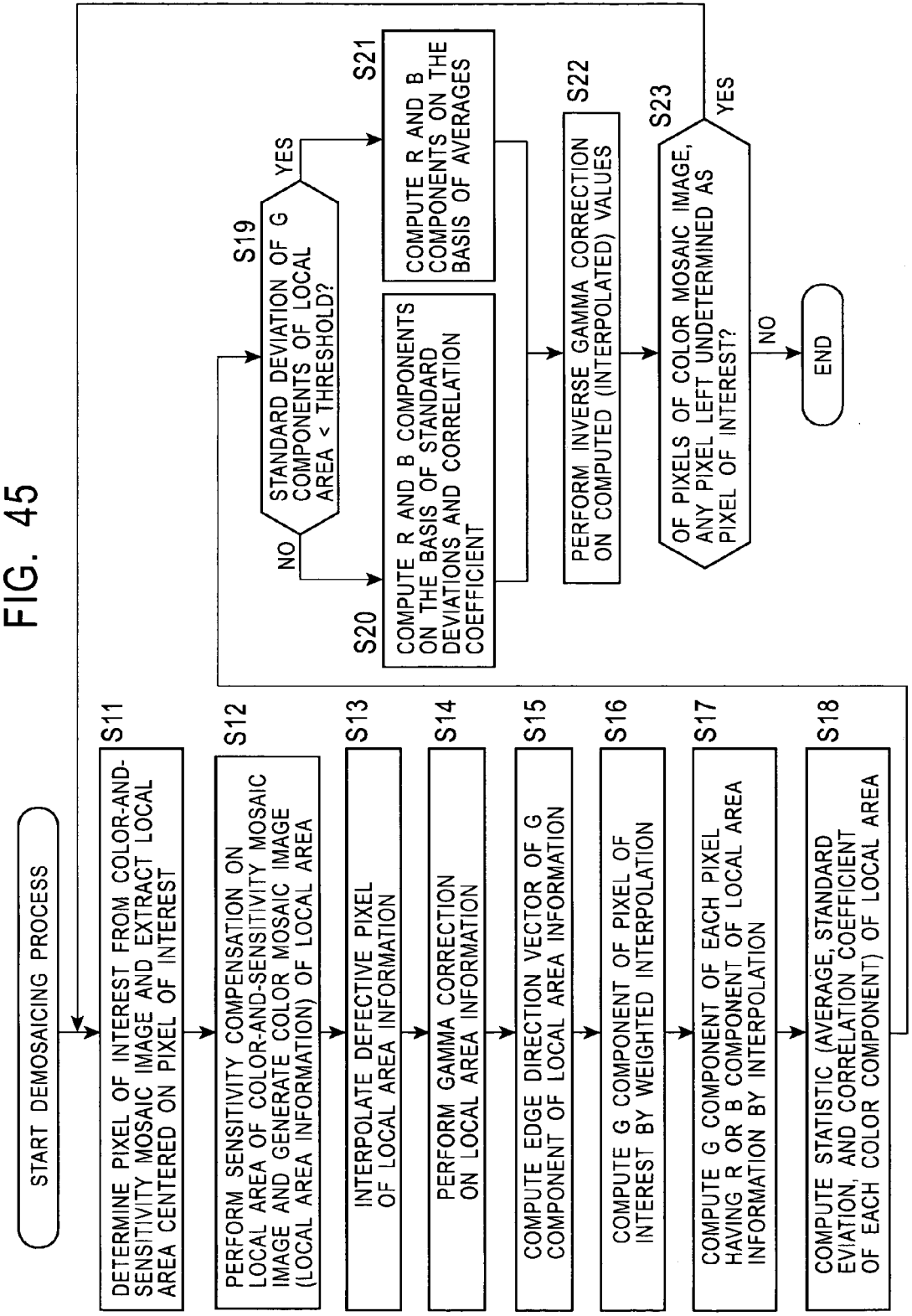
FIG. 45 is a flowchart describing a demosaicing process performed by the image processor shown in FIG. 31.

Referring to the flowchart of FIG. 45, a demosaicing process performed by the image processor 7 shown in FIG. 31 will now be described.

In step S11, the pixel-of-interest determination unit 61 sequentially (one at a time) determines, of pixels of a color-and-sensitivity mosaic image received from the previous stage, one pixel as a pixel of interest, extracts a local area (e.g., 7 by 7 pixels) centered on the pixel of interest, and stores the local area in the hold memory 62. In step S12, of pixels included in the local color-and-sensitivity mosaic image held in the hold memory 62, the sensitivity compensation unit 63 compensates a color component signal of a low-sensitivity pixel for sensitivity so that the color component signal corresponds to that captured with high sensitivity and outputs the resulting local color mosaic image as local area information to the defective-pixel interpolation unit 64.

In step S13, when the pixel of interest at the center of the local area information received from the sensitivity compensation unit 63 is a defective pixel, the defective-pixel interpolation unit 64 interpolates the defective pixel using other pixels included in the local area information and outputs the local area information in which the pixel of interest is interpolated to the gamma correction unit 65. In step S14, the gamma correction unit 65 performs gamma correction on each pixel included in the local area information received from the defective-pixel interpolation unit 64 and outputs the gamma-corrected local area information to the edge detector 66, the G-component computing unit 67, and the phase locking unit 68.

In step S15, the edge-direction detector 66 detects an edge of the local area information received from the gamma correction unit 65 and outputs detection results including an edge direction vector and the edge size to the G-component computing unit 67. In step S16, the G-component computing unit 67 performs weighted interpolation of the green (G) component associated with the pixel of interest at the center of the local area information received from the gamma correction unit 65 using its neighboring pixels having the green (G) component and outputs the interpolated green (G) component to the first R-and-B-component computing unit 70, the second R-and-B-component computing unit 71, and the inverse gamma conversion unit 73.

In step S17, the phase locking unit 68 interpolates the green (G) component associated with each pixel that is included in the local area information received from the gamma correction unit 65 and that has the blue (B) or red (R) component using pixels that are adjacent (above, below, left, and right) to this pixel and that have the green (G) component, adds the interpolated green (G) component to the local area information, and outputs the resulting local area information to the statistic computing unit 69. In step S18, on the basis of the local area information received from the phase locking unit 68, the statistic computing unit 69 computes the standard deviation of the red (R) components stddev R, the average of the red (R) components avg R, the standard deviation of the green (G) components stddev G, the average of the green (G) components avg G, the standard deviation of the blue (B) components stddev B, the average of the blue (B) components avg B, the correlation coefficient between the red (R) and green (G) components correlation(R, G), and the correlation coefficient between the blue (B) and green (G) components correlation(B, G) of the local area and outputs these computation results to the first R-and-B-component computing unit 70. The statistic computing unit 69 outputs the average of the red (R) components avg R, the average of the green (G) components avg G, and the average of the blue (B) components avg B to the second R-and-B-component computing unit 71. The statistic computing unit 69 outputs the standard deviation of the green (G) components stddev G to the selector 72.

The processing in steps S15 and S16 and the processing in steps S17 and S18 may be performed in parallel with each other.

In step S19, it is determined whether the standard deviation of the green (G) components of the local area stddev G computed by the statistic computing unit 69 falls below a predetermined threshold. When it is determined that the standard deviation of the green (G) components of the local area stddev G does not fall below the predetermined threshold, the process proceeds to step S20.

In step S20, the first R-and-B-component computing unit 70 computes the red (R) component of the pixel of interest on the basis of the green (G) component of the pixel of interest, which is received from the G-component computing unit 67, and the standard deviation of the red (R) components stddev R, the average of the red (R) components avg R, the standard deviation of the green (G) components stddev G, the average of the green (G) components avg G, and the correlation coefficient between the red (R) and green (G) components correlation(R, G), which are received from the statistic computing unit 69, and outputs the computed red (R) component to the selector 72. Also, the first R-and-B-component computing unit 70 computes the blue (B) component of the pixel of interest on the basis of the green (G) component of the pixel of interest, which is received from the G-component computing unit 67, and the standard deviation of the blue (B) components stddev B, the average of the blue (B) components avg B, the standard deviation of the green (G) components stddev G, the average of the green (G) components avg G, and the correlation coefficient between the blue (B) and green (G) components correlation (B, G), which are received from the statistic computing unit 69, and outputs the computed blue (B) component to the selector 72. The selector 72 outputs the outputs of the first R-and-B-component computing unit 70 as the red (R) and blue (B) components of the pixel of interest to the inverse gamma conversion unit 73.

In contrast, when it is determined in step S19 that the standard deviation of the green (G) components of the local area stddev G falls below the predetermined threshold, the process proceeds to step S21.

In step S21, the second R-and-B-component computing unit 71 computes the red (R) component of the pixel of interest on the basis of the green (G) component of the pixel of interest, which is received from the G-component computing unit 67, and the average of the red (R) components avg R and the average of the green (G) components avg G, which are received from the statistic computing unit 69, and outputs the computed red (R) component of the pixel of interest to the selector 72. Also, the second R-and-B-component computing unit 71 computes the blue (B) component of the pixel of interest on the basis of the green (G) component of the pixel of interest, which is received from the G-component computing unit 67, and the average of the blue (B) components avg B and the average of the green (G) components avg G, which are received from the statistic computing unit 69, and outputs the computed blue (B) component of the pixel of interest to the selector 72. The selector 72 outputs the outputs of the second R-and-B-component computing unit 71 as the red (R) and blue (B) components of the pixel of interest to the inverse gamma conversion unit 73.

In step S22, the inverse gamma conversion unit 73 performs inverse gamma conversion of the green (G) component of the pixel of interest, which is received from the G-component computing unit 67, and the red (R) and blue (B) components of the pixel of interest, which are received from the selector 72, and outputs the results as the red (R), green (G), and blue (B) components of a wide dynamic range color image associated with the pixel of interest to the subsequent stage.

In step S23, the pixel-of-interest determination unit 61 determines, of the pixels of the color mosaic image held in the hold memory 62, whether there is a pixel that has not yet been determined as a pixel of interest. When it is determined that there is a pixel that has not yet been determined as a pixel of interest, the process returns to step S12, and the processing from step S12 onward is repeated. Subsequently, when it is determined in step S23 that there is no pixel that has not yet been determined as a pixel of interest, it means that the red (R), green (G), and blue (B) components of all pixels of the wide dynamic range color image have been output. The demosaicing process is thus completed. The description of the demosaicing process performed by the first example of the image processor 7 is completed.

Figure 46:
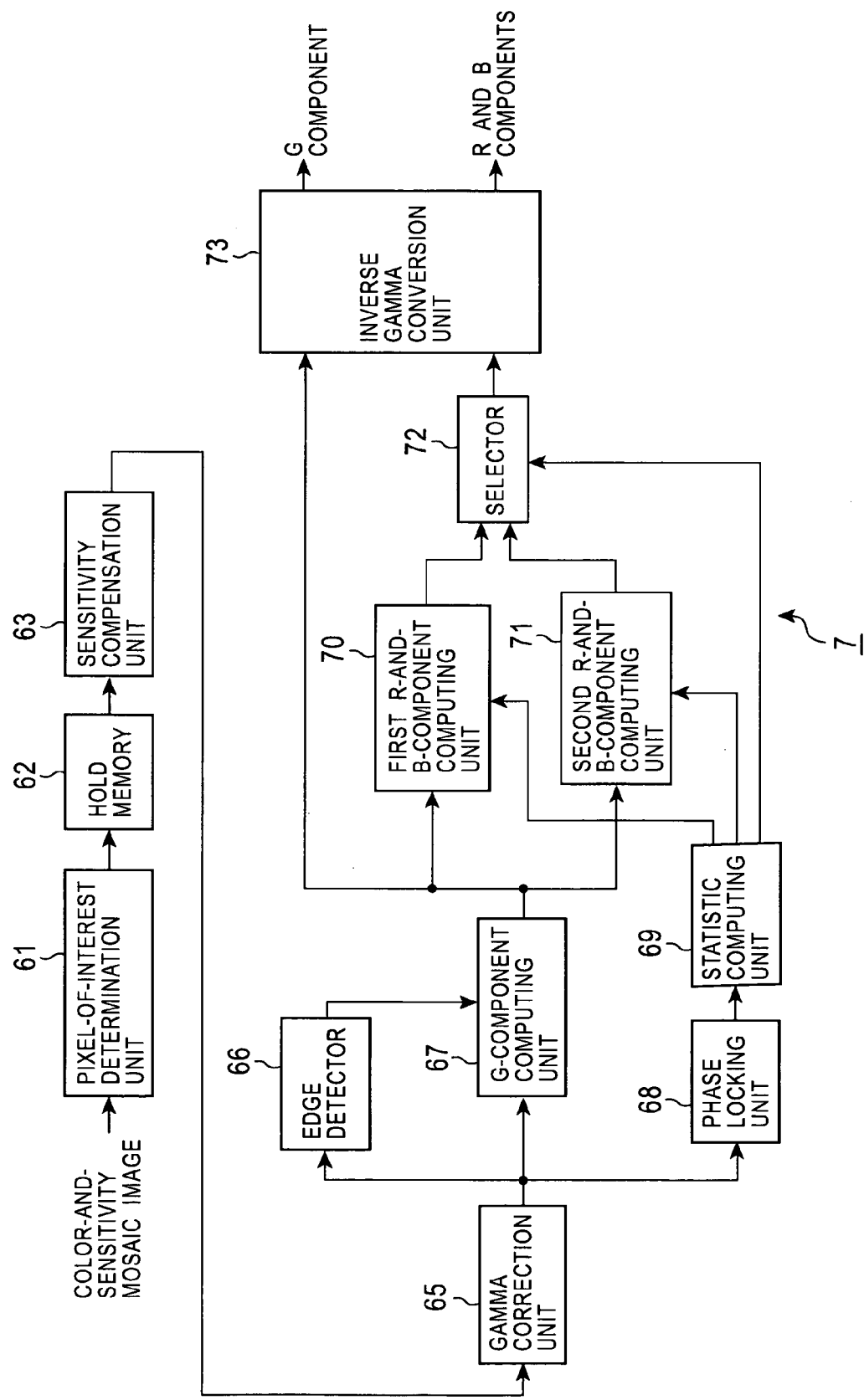
FIG. 46 is a block diagram of a second example of the structure of the image processor shown in FIG. 1.

FIG. 46 shows a second example of the structure of the image processor 7. The second example of the structure is the same as the first example of the structure shown in FIG. 31 except that the defective-pixel interpolation unit 64 is omitted from the first example of the structure, and the same reference numerals are used to refer to the same components. In the second example of the structure, a pixel determined by the validity determination unit 83 of the sensitivity compensation unit 63 as an invalid pixel (defective pixel) is not interpolated. From the gamma correction unit 65 and onward, such a defective pixel should not be used in computation, such as interpolation.

Figure 47:
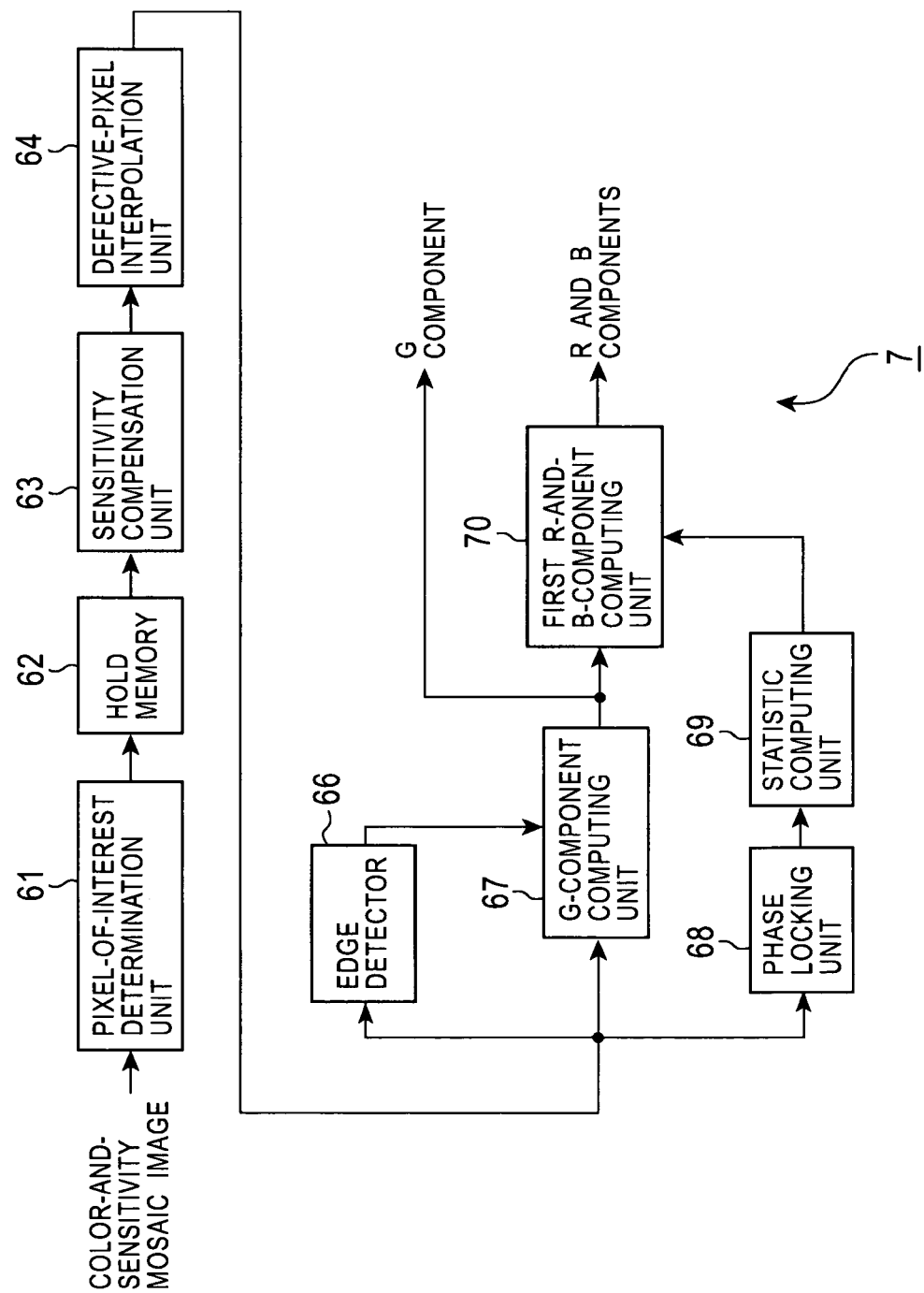
FIG. 47 is a block diagram of a third example of the structure of the image processor shown in FIG. 1.

FIG. 47 shows a third example of the structure of the image processor 7. The third example of the structure is the same as the first example of the structure shown in FIG. 31 except that the gamma correction unit 65, the second R-and-B-component computing unit 71, the selector 72, and the inverse gamma conversion unit 73 are omitted from the first example of the structure, and the same reference numerals are used to refer to the same components. In the third example of the structure, the red (R) and blue (B) components of the pixel of interest are computed on the basis of the standard deviation of the red (R) components stddev R, the average of the red (R) components avg R, the standard deviation of the green (G) components stddev G, the average of the green (G) components avg G, the standard deviation of the blue (B) components stddev B, the average of the blue (B) components avg B, the correlation coefficient between the red (R) and blue (B) components correlation(R, G), and the correlation coefficient between the blue (B) and green (G) components correlation(B, G).

Figure 48:
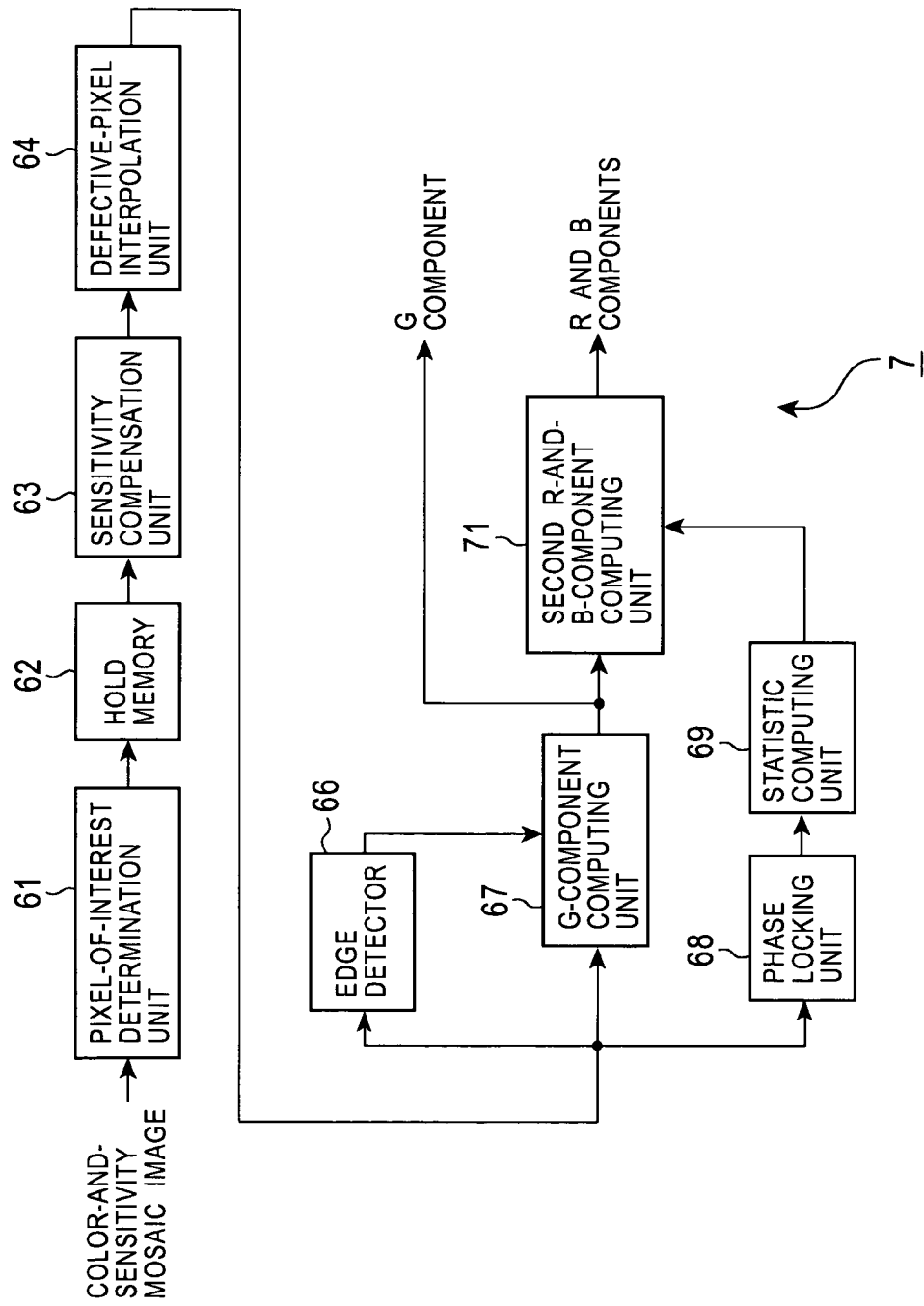
FIG. 48 is a block diagram of a fourth example of the structure of the image processor shown in FIG. 1.

FIG. 48 shows a fourth example of the structure of the image processor 7. The fourth example of the structure is the same as the first example of the structure shown in FIG. 31 except that the gamma correction unit 65, the first R-and-B-component computing unit 70, the selector 72, and the inverse gamma conversion unit 73 are omitted from the first example of the structure, and the same reference numerals are used to refer to the same components. In the fourth example of the structure, the statistic computing unit 69 computes only the average of the red (R) components avg R, the average of the green (G) components avg G, and the average of the blue (B) components avg B of the local area. The red (R) and blue (B) components of the pixel of interest are computed on the basis of the average of the red (R) components avg R, the average of the green (G) components avg G, and the average of the blue (B) components avg B, which are computed by the statistic computing unit 69.

Figure 49:
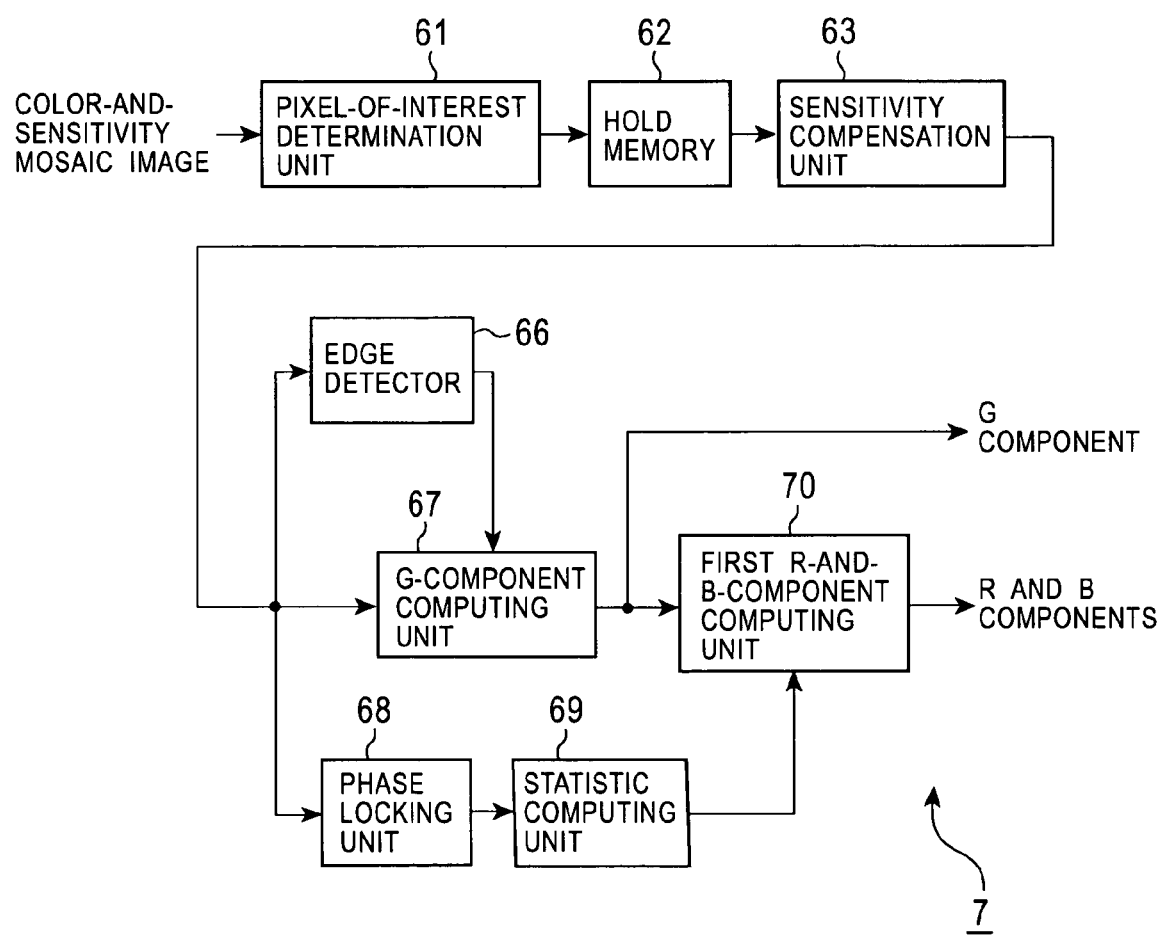
FIG. 49 is a block diagram of a fifth example of the structure of the image processor shown in FIG. 1.

FIG. 49 shows a fifth example of the structure of the image processor 7. The fifth example of the structure is the same as the third example of the structure shown in FIG. 47 except that the defective-pixel interpolation unit 64 is omitted from the third example of the structure, and the same reference numerals are used to refer to the same components. In the fifth example of the structure, a pixel determined by the validity determination unit 83 of the sensitivity compensation unit 63 as an invalid pixel (defective pixel) is not interpolated. Subsequent to the sensitivity compensation unit 63, such a defective pixel should not be used in computation, such as interpolation.

Figure 50:
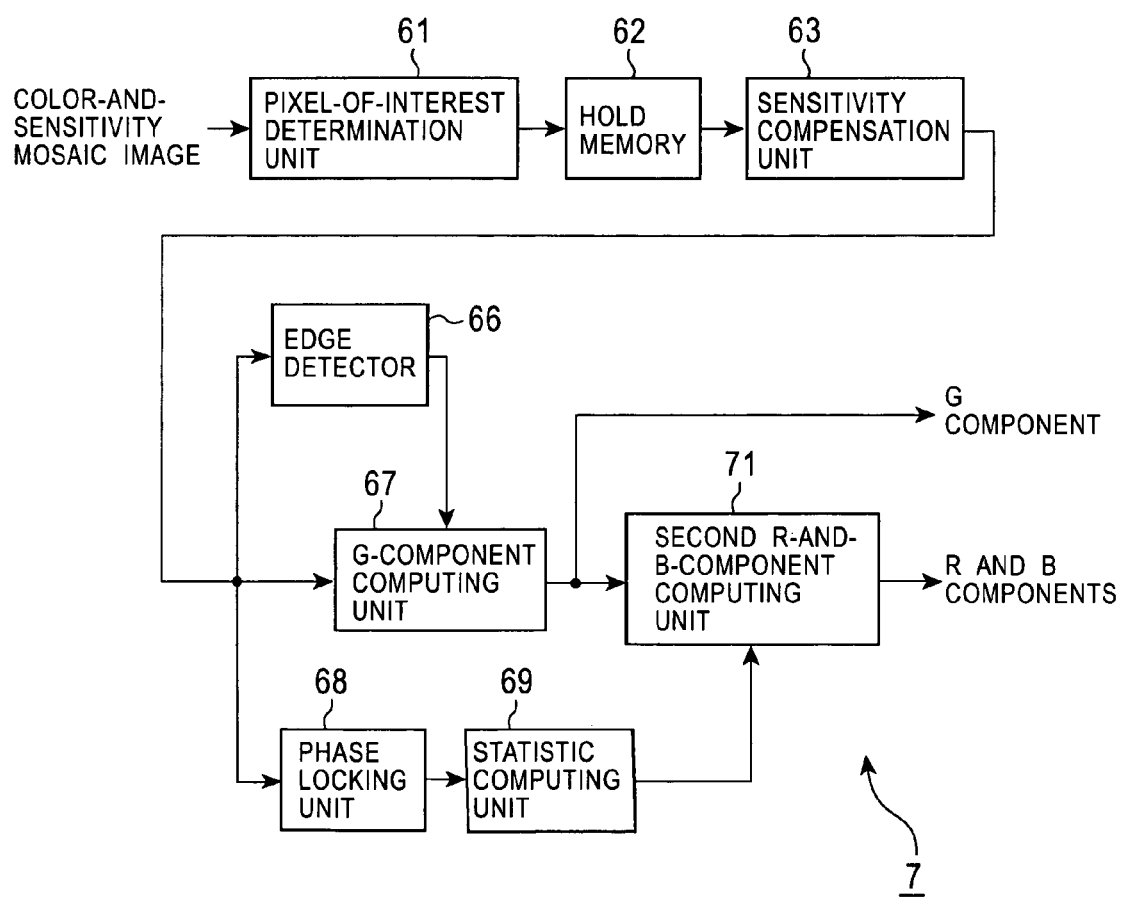
FIG. 50 is a block diagram of a sixth example of the structure of the image processor shown in FIG. 1.

FIG. 50 shows a sixth example of the structure of the image processor 7. The sixth example of the structure is the same as the fourth example of the structure shown in FIG. 48 except that the defective-pixel interpolation unit 64 is omitted from the fourth example of the structure, and the same reference numerals are used to refer to the same components. In the sixth example of the structure, a pixel determined by the validity determination unit 83 of the sensitivity compensation unit 63 as an invalid pixel (defective pixel) is not interpolated. Subsequent to the sensitivity compensation unit 63, such a defective pixel should not be used in computation, such as interpolation.

As described above, in any example of the structure of the image processor 7, a process is performed on each piece of local area information (e.g., 7 by 7 pixels) centered on a pixel of interest of a received color-and-sensitivity mosaic image. A memory for storing the entire image is thus unnecessary. Compared with a case in which the prior art is applied, the circuit size is reduced. Since interpolation, taking into consideration the edge of each local area, is performed in each local area, a wide dynamic range color image is generated in which high-frequency components of the image are reproduced while noise is suppressed.

In this embodiment, an edge direction vector is detected using pixels that are included in the local area and that have the green (G) component. On the basis of the detection result, the green (G) component of the pixel of interest is interpolated, and then the red (R) and blue (B) components of the pixel of interest are interpolated. Alternatively, an edge direction vector may be detected using pixels that are included in the local area and that have the red (R) component. On the basis of the detection result, the red (R) component of the pixel of interest may be interpolated, and then the green (G) and blue (B) components of the pixel of interest may be interpolated. Alternatively, an edge direction vector may be detected using pixels that are included in the local area and that have the blue (B) component. On the basis of the detection result, the blue (B) component of the pixel of interest may be interpolated, and then the red (R) and green (G) components of the pixel of interest may be interpolated.

In the present invention, the pixels of a color-and-sensitivity mosaic image may include a combination of color components other than the red (R), green (G), and blue (B) components.

The present invention is applicable not only to a digital still camera, but also to a scanner or the like.

The above-described demosaicing process may be performed not only by hardware, but also by software. To perform a series of processes by software, a program constituting the software is installed from a recording medium on a computer included in dedicated hardware or, for example, a general personal computer capable of performing various functions by installing various programs.

Figure 51:
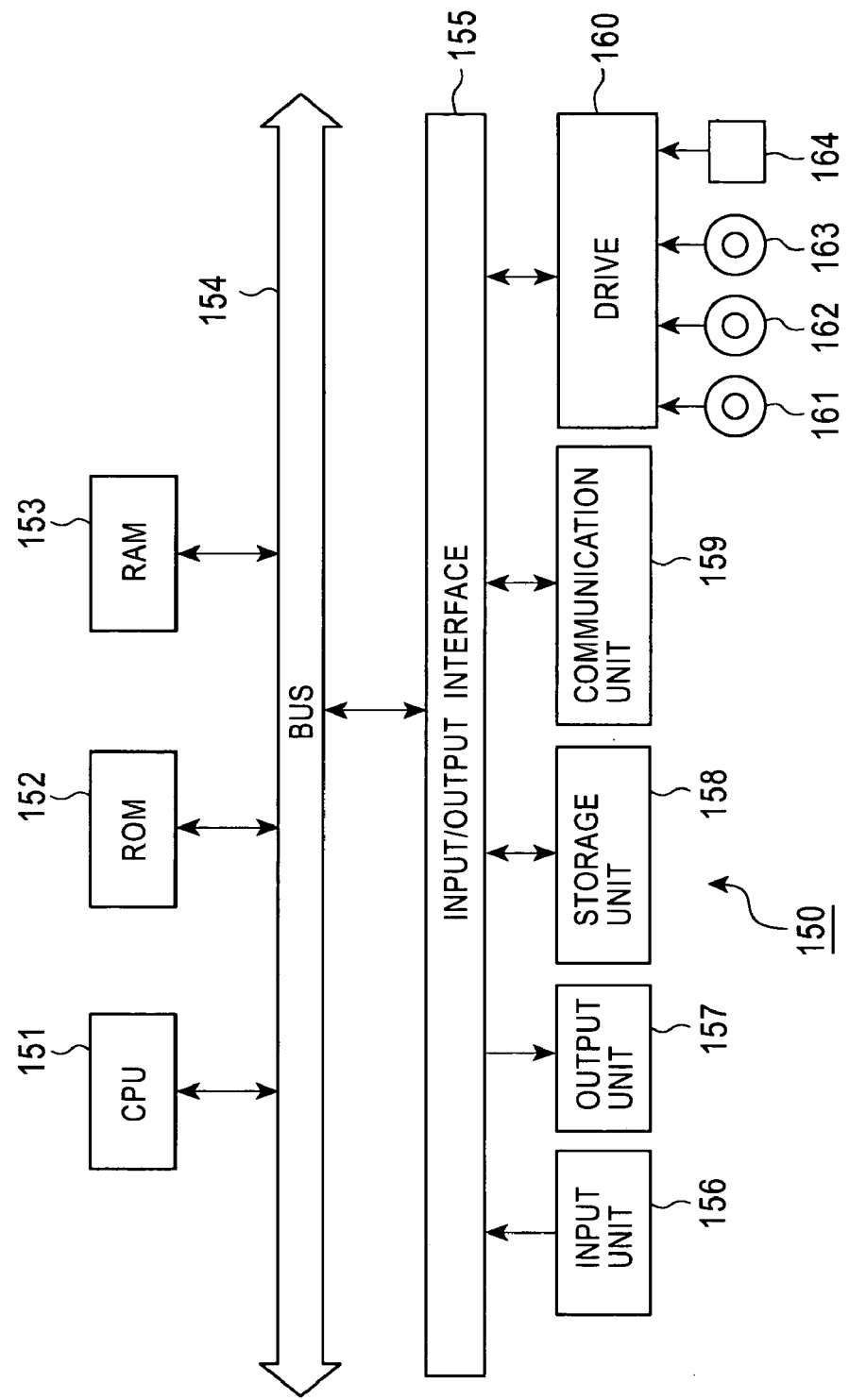
FIG. 51 is a block diagram of an example of the structure of a general personal computer.

FIG. 51 shows an example of the structure of a general personal computer. A personal computer 150 includes a CPU (Central Processing Unit) 151. An input/output interface 155 is connected to the CPU 151 via a bus 154. A ROM (Read Only Memory) 152 and a RAM (Random Access Memory) 153 are connected to the bus 154.

An input unit 156, such as an input device including a keyboard and a mouse for entering an operation command by a user, an output unit 157 that outputs a processing operation screen and an image generated as a result of processing to a display device, a storage unit 158 including a hard disk drive or the like for storing programs and various data, and a communication unit 159 that includes a LAN (Local Area network) adapter or the like and that performs communication via a network, such as the Internet, are connected to the input/output interface 155. Also, a drive 160 for reading data from or writing data to a recording medium, such as a magnetic disk 161 (including a flexible disk), an optical disk 162 (including a CD-ROM (Compact Disk-Read Only Memory) or a DVD (Digital Versatile Disk)), a magneto-optical disk 163 (including an MD (Mini Disc)), or a semiconductor memory 164, is connected to the input/output interface 155.

The CPU 151 performs various processes in accordance with the program stored on the ROM 152 or the program read from the recording medium, such as the magnetic disk 161 to the semiconductor memory 164, installed on the storage unit 158, and loaded from the storage unit 158 to the RAM 153. The RAM 153 also stores necessary data for the CPU 151 to perform these various processes.

In the present specification, steps for writing the program recorded on the recording medium include not only time-series processing performed in accordance with the described order, but also parallel or individual processing, which may not necessarily be performed in time series.

What is claimed is:

1. An image processing apparatus for generating a color image, in which each pixel in the color image has a plurality of color components and a uniform sensitivity characteristic relative to optical intensity, on the basis of a color-and-sensitivity mosaic image in which each pixel has one of the plurality of color components and is captured with one of a plurality of sensitivity characteristics relative to the optical intensity, comprising:

extraction means for extracting a predetermined area centered on a pixel of interest, which is an object to be processed, from the color-and-sensitivity mosaic image;

generation means for making uniform the sensitivity characteristics relative to the optical intensity of pixels included in the predetermined area extracted by the extraction means and generating local area information including the pixels, each of the pixels having one of the plurality of color components and the uniform sensitivity characteristic relative to the optical intensity;

edge detection means for detecting an edge of the local area information on the basis of, of the pixels included in the local area information, those pixels having a first color component;

first interpolation means for interpolating the first color component associated with the pixel of interest by computing a weighted average using, of the pixels included in the local area information, those pixels having the first color component, on the basis of the direction of the edge detected by the edge detection means;

statistic-information computing means for computing statistical information on the basis of the pixels included in the local area information; and second interpolation means for interpolating a color component other than the first color component associated with the pixel of interest on the basis of the first color component associated with the pixel of interest, which is interpolated by the first interpolation means, and the statistical information, wherein the statistic-information computing means computes, as the statistical information, at least one of an average of each color component, a standard deviation of each color component, and a correlation coefficient between the first color component and the other color component on the basis of those pixels included in the local area information, and wherein the second interpolation means interpolates the other color component, the color component other than the first color component associated with the pixel of interest, on the basis of the first color component associated with the pixel of interest, which is interpolated by the first interpolation means, and the average of the other color component, the standard deviation of the other color component, and the correlation coefficient between the first color component and the other color component, which are computed by the statistic-information computing means.

2. The image processing apparatus according to claim 1, further comprising:

gamma conversion means for performing gamma conversion of the pixels included in the local area information; and inverse gamma conversion means for performing inverse gamma conversion of the first color component associated with the pixel of interest, which is interpolated by the first interpolation means, and the color component other than the first color component associated with the pixel of interest, which is interpolated by the second interpolation means.

3. The image processing apparatus according to claim 1, wherein the first color component is a color component that statistically has the highest signal level of the plurality of color components.

4. The image processing apparatus according to claim 1, wherein the first color component is a color component that occupies the largest portion of the color mosaic image of the plurality of color components.

5. The image processing apparatus according to claim 1, further comprising defective-pixel interpolation means for interpolating a defective pixel included in the local area information using pixels neighboring the defective pixel.

6. An image processing apparatus for generating a color image, in which each pixel in the color image has a plurality of color components and a uniform sensitivity characteristic relative to optical intensity, on the basis of a color-and-sensitivity mosaic image in which each pixel has one of the plurality of color components and is captured with one of a plurality of sensitivity characteristics relative to the optical intensity, comprising:
  extraction means for extracting a predetermined area centered on a pixel of interest, which is an object to be processed, from the color-and-sensitivity mosaic image;
  generation means for making uniform the sensitivity characteristics relative to the optical intensity of pixels included in the predetermined area extracted by the extraction means and generating local area information including the pixels, each of the pixels having one of the plurality of color components and the uniform sensitivity characteristic relative to the optical intensity;
  edge detection means for detecting an edge of the local area information on the basis of, of the pixels included in the local area information, those pixels having a first color component;
  first interpolation means for interpolating the first color component associated with the pixel of interest by computing a weighted average using, of the pixels included in the local area information, those pixels having the first color component, on the basis of the direction of the edge detected by the edge detection means;
  statistic-information computing means for computing statistical information on the basis of the pixels included in the local area information; and
  second interpolation means for interpolating a color component other than the first color component associated with the pixel of interest on the basis of the first color component associated with the pixel of interest, which is interpolated by the first interpolation means, and the statistical information, wherein
  the statistic-information computing means computes, as the statistical information, at least one of an average of each color component, a standard deviation of each color component, and a correlation coefficient between the first color component and the other color component on the basis of those pixels included in the local area information, and
  wherein the second interpolation means includes
  first computation means for computing the other color component, the color component other than the first color component associated with the pixel of interest, on the basis of the first color component associated with the pixel of interest, which is interpolated by the first interpolation means, and the average of the other color component, the standard deviation of the other color component, and the correlation coefficient between the first color component and the other color component, which are computed by the statistic-information computing means; and
  second computation means for computing the other color component, the color component other than the first color component associated with the pixel of interest, on the basis of the first color component associated with the pixel of interest, which is interpolated by the first interpolation means, and the average of the other color component, which is computed by the statistic-information computing means,
  wherein one of the first computation means and the second computation means is selected to interpolate the other color component associated with the pixel of interest.

7. The image processing apparatus according to claim 6, wherein the second interpolation means selects one of the first computation means and the second computation means on the basis of the standard deviation of the first color component, which is computed by the statistic-information computing means, to interpolate the other color component associated with the pixel of interest.

8. The image processing apparatus according to claim 6, further comprising:
  gamma conversion means for performing gamma conversion of the pixels included in the local area information; and
  inverse gamma conversion means for performing inverse gamma conversion of the first color component associated with the pixel of interest, which is interpolated by the first interpolation means, and the color component other than the first color component associated with the pixel of interest, which is interpolated by the second interpolation means.

9. The image processing apparatus according to claim 6, wherein the first color component is a color component that statistically has the highest signal level of the plurality of color components.

10. The image processing apparatus according to claim 6, wherein the first color component is a color component that occupies the largest portion of the color mosaic image of the plurality of color components.

11. The image processing apparatus according to claim 6, further comprising defective-pixel interpolation means for interpolating a defective pixel included in the local area information using pixels neighboring the defective pixel.

12. An image processing apparatus for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, comprising:
  extraction unit configured to extract a predetermined area centered on a pixel of interest, which is an object to be processed, from the color-and-sensitivity mosaic image;
  generation unit configured to make uniform the sensitivity characteristics relative to the optical intensity of pixels included in the predetermined area extracted by the extraction unit and configured to generate local area information including the pixels, each of the pixels having one of the plurality of color components and the uniform sensitivity characteristic relative to the optical intensity;

edge detection unit configured to detect an edge of the local area information on the basis of, of the pixels included in the local area information, those pixels having a first color component;

first interpolation unit configured to interpolate the first color component associated with the pixel of interest by computing a weighted average using, of the pixels included in the local area information, those pixels having the first color component, on the basis of the direction of the edge detected by the edge detection unit;

statistic-information computing unit configured to compute statistic information on the basis of the pixels included in the local area information; and second interpolation unit configured to interpolate a color component other than the first color component associated with the pixel of interest on the basis of the first color component associated with the pixel of interest, which is interpolated by the first interpolation unit, and the statistic information, wherein the statistic-information computing unit is configured to compute, as the statistical information, at least one of an average of each color component, a standard deviation of each color component, and a correlation coefficient between the first color component and the other color component on the basis of those pixels included in the local area information, and the second interpolation unit is configured to interpolate the other color component, the color component other than the first color component associated with the pixel of interest, on the basis of the first color component associated with the pixel of interest, which is interpolated by the first interpolation unit, and the average of the other color component, the standard deviation of the other color component, and the correlation coefficient between the first color component and the other color component, which are computed by the statistic-information computing unit.

13. An image processing apparatus for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, comprising:

extraction unit configured to extract a predetermined area centered on a pixel of interest, which is an object to be processed, from the color-and-sensitivity mosaic image;

generation unit configured to make uniform the sensitivity characteristics relative to the optical intensity of pixels included in the predetermined area extracted by the extraction unit and configured to generate local area information including the pixels, each of the pixels having one of the plurality of color components and the uniform sensitivity characteristic relative to the optical intensity;

edge detection unit configured to detect an edge of the local area information on the basis of, of the pixels included in the local area information, those pixels having a first color component;

first interpolation unit configured to interpolate the first color component associated with the pixel of interest by computing a weighted average using, of the pixels included in the local area information, those pixels having the first color component, on the basis of the direction of the edge detected by the edge detection unit;

statistic-information computing unit configured to compute statistic information on the basis of the pixels included in the local area information; and second interpolation unit configured to interpolate a color component other than the first color component associated with the pixel of interest on the basis of the first color component associated with the pixel of interest, which is interpolated by the first interpolation unit, and the statistic information, wherein the statistic-information computing unit is configured to compute, as the statistical information, at least one of an average of each color component, a standard deviation of each color component, and a correlation coefficient between the first color component and the other color component on the basis of those pixels included in the local area information, and the second interpolation unit includes first computation unit configured to compute the other color component, the color component other than the first color component associated with the pixel of interest, on the basis of the first color component associated with the pixel of interest, which is interpolated by the first interpolation unit, and the average of the other color component, the standard deviation of the other color component, and the correlation coefficient between the first color component and the other color component, which are computed by the statistic-information computing unit; and second computation unit for computing the other color component, the color component other than the first color component associated with the pixel of interest, on the basis of the first color component associated with the pixel of interest, which is interpolated by the first interpolation unit, and the average of the other color component, which is computed by the statistic-information computing unit, wherein one of the first computation unit and the second computation unit is selected to interpolate the other color component associated with the pixel of interest.

14. An image processing method for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, the method comprising:

an extraction step of extracting a predetermined area centered on a pixel of interest, which is an object to be processed, from the color-and-sensitivity mosaic image;

a generation step of making uniform the sensitivity characteristics relative to the optical intensity of pixels included in the predetermined area extracted in the extraction step and generating local area information including the pixels, each of the pixels having one of the plurality of color components and the uniform sensitivity characteristic relative to the optical intensity;

an edge detection step of detecting an edge of the local area information on the basis of, of the pixels included in the local area information, those pixels having a first color component;

a first interpolation step of interpolating the first color component associated with the pixel of interest by computing a weighted average using, of the pixels included in the local area information, those pixels having the first color component on the basis of the direction of the edge detected in the edge detection step;

a statistic-information computing step of computing statistical information on the basis of the pixels included in the local area information; and a second interpolation step of interpolating a color component other than the first color component associated with the pixel of interest on the basis of the first color component associated with the pixel of interest, which is interpolated in the first interpolation step, and the statistical information, wherein the statistic-information computing step computes, as the statistical information, at least one of an average of each color component, a standard deviation of each color component, and a correlation coefficient between the first color component and the other color component on the basis of those pixels included in the local area information, and the second interpolation step interpolates the other color component, the color component other than the first color component associated with the pixel of interest, on the basis of the first color component associated with the pixel of interest, which is interpolated by the first interpolation step, and the average of the other color component, the standard deviation of the other color component, and the correlation coefficient between the first color component and the other color component, which are computed by the statistic-information computing step.

15. An image processing method for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, the method comprising:

an extraction step of extracting a predetermined area centered on a pixel of interest, which is an object to be processed, from the color-and-sensitivity mosaic image;

a generation step of making uniform the sensitivity characteristics relative to the optical intensity of pixels included in the predetermined area extracted in the extraction step and generating local area information including the pixels, each of the pixels having one of the plurality of color components and the uniform sensitivity characteristic relative to the optical intensity;

an edge detection step of detecting an edge of the local area information on the basis of, of the pixels included in the local area information, those pixels having a first color component;

a first interpolation step of interpolating the first color component associated with the pixel of interest by computing a weighted average using, of the pixels included in the local area information, those pixels having the first color component on the basis of the direction of the edge detected in the edge detection step;

a statistic-information computing step of computing statistical information on the basis of the pixels included in the local area information; and a second interpolation step of interpolating a color component other than the first color component associated with the pixel of interest on the basis of the first color component associated with the pixel of interest, which is interpolated in the first interpolation step, and the statistical information, wherein the statistic-information computing step computes, as the statistical information, at least one of an average of each color component, a standard deviation of each color component, and a correlation coefficient between the first color component and the other color component on the basis of those pixels included in the local area information, and the second interpolation step includes a first computation step for computing the other color component, the color component other than the first color component associated with the pixel of interest, on the basis of the first color component associated with the pixel of interest, which is interpolated by the first interpolation step, and the average of the other color component, the standard deviation of the other color component, and the correlation coefficient between the first color component and the other color component, which are computed by the statistic-information computing step; and a second computation step for computing the other color component, the color component other than the first color component associated with the pixel of interest, on the basis of the first color component associated with the pixel of interest, which is interpolated by the first interpolation step, and the average of the other color component, which is computed by the statistic-information computing step, wherein one of the first computation step and the second computation step is selected to interpolate the other color component associated with the pixel of interest.

16. A computer-readable medium including computer-executable instructions, wherein the instructions, when executed by a computer, cause the computer to perform a method for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, the program comprising:

an extraction step of extracting a predetermined area centered on a pixel of interest, which is an object to be processed, from the color-and-sensitivity mosaic image;

a generation step of making uniform the sensitivity characteristics relative to the optical intensity of pixels included in the predetermined area extracted in the extraction step and generating local area information including the pixels, each of the pixels having one of the plurality of color components and the uniform sensitivity characteristic relative to the optical intensity;

an edge detection step of detecting an edge of the local area information on the basis of, of the pixels included in the local area information, those pixels having a first color component;

a first interpolation step of interpolating the first color component associated with the pixel of interest by computing a weighted average using, of the pixels included in the local area information, those pixels having the first color component on the basis of the direction of the edge detected in the edge detection step;

a statistic-information computing step of computing statistic information on the basis of the pixels included in the local area information; and a second interpolation step of interpolating a color component other than the first color component associated with the pixel of interest on the basis of the first color component associated with the pixel of interest, which is interpolated in the first interpolation step, and the statistic information, wherein the statistic-information computing step computes, as the statistical information, at least one of an average of each color component, a standard deviation of each color component, and a correlation coefficient between the first color component and the other color component on the basis of those pixels included in the local area information, and the second interpolation step interpolates the other color component, the color component other than the first color component associated with the pixel of interest, on the basis of the first color component associated with the pixel of interest, which is interpolated by the first interpolation step, and the average of the other color component, the standard deviation of the other color component, and the correlation coefficient between the first color component and the other color component, which are computed by the statistic-information computing step.

17. A computer-readable medium including computer-executable instructions, wherein the instructions, when executed by a computer, cause the computer to perform a method for generating a color image in which each pixel in the color image has a plurality of color components and a uniform sensitivity characteristic relative to optical intensity on the basis of a color-and-sensitivity mosaic image in which each pixel has one of the plurality of color components and is captured with one of a plurality of sensitivity characteristics relative to the optical intensity, the program comprising:

an extraction step of extracting a predetermined area centered on a pixel of interest, which is an object to be processed, from the color-and-sensitivity mosaic image;

a generation step of making uniform the sensitivity characteristics relative to the optical intensity of pixels included in the predetermined area extracted in the extraction step and generating local area information including the pixels, each of the pixels having one of the plurality of color components and the uniform sensitivity characteristic relative to the optical intensity;

an edge detection step of detecting an edge of the local area information on the basis of, of the pixels included in the local area information, those pixels having a first color component;

a first interpolation step of interpolating the first color component associated with the pixel of interest by computing a weighted average using, of the pixels included in the local area information, those pixels having the first color component on the basis of the direction of the edge detected in the edge detection step;

a statistic-information computing step of computing statistic information on the basis of the pixels included in the local area information; and a second interpolation step of interpolating a color component other than the first color component associated with the pixel of interest on the basis of the first color component associated with the pixel of interest, which is interpolated in the first interpolation step, and the statistic information, wherein the statistic-information computing step computes, as the statistical information, at least one of an average of each color component, a standard deviation of each color component, and a correlation coefficient between the first color component and the other color component on the basis of those pixels included in the local area information, and the second interpolation step includes a first computation step for computing the other color component, the color component other than the first color component associated with the pixel of interest, on the basis of the first color component associated with the pixel of interest, which is interpolated by the first interpolation step, and the average of the other color component, the standard deviation of the other color component, and the correlation coefficient between the first color component and the other color component, which are computed by the statistic-information computing step; and a second computation step for computing the other color component, the color component other than the first color component associated with the pixel of interest, on the basis of the first color component associated with the pixel of interest, which is interpolated by the first interpolation step, and the average of the other color component, which is computed by the statistic-information computing step, wherein one of the first computation step and the second computation step is selected to interpolate the other color component associated with the pixel of interest.

* * * * *